United States Patent [19]

Feistel

[11] 4,195,200
[45] Mar. 25, 1980

[54] KEY CONTROLLED BLOCK-CIPHER CRYPTOGRAPHIC SYSTEM EMPLOYING A MULTIDIRECTIONAL SHIFT MATRIX

[75] Inventor: Horst Feistel, Mount Kisco, N.Y.

[73] Assignee: International Business Machines Corporation, Armonk, N.Y.

[21] Appl. No.: 701,060

[22] Filed: Jun. 30, 1976

[51] Int. Cl.² .............................................. H04L 9/00
[52] U.S. Cl. ..................................... 178/22; 364/900
[58] Field of Search ..................... 178/22; 235/92 SH; 340/172.5; 364/900

[56] References Cited

U.S. PATENT DOCUMENTS

| | | | |
|---|---|---|---|
| 3,522,374 | 7/1970 | Abrahamsen et al. | 178/22 |
| 3,657,699 | 4/1972 | Rocher | 178/22 |
| 3,796,830 | 3/1974 | Smith | 178/22 |
| 3,798,360 | 3/1974 | Feistel | 178/22 |
| 3,962,539 | 6/1976 | Ehrsam | 178/22 |

Primary Examiner—Howard A. Birmiel
Attorney, Agent, or Firm—Roy R. Schlemmer, Jr.

[57] ABSTRACT

A cryptographic system for enciphering a block of binary data under the control of a unique key consisting of a set of binary symbols. A clear message represented in binary data format is transformed into a cipher message (and vise versa) by operating on blocks of clear information utilizing the operations of directional shifting of a derivative form of said clear data in a multidimensional matrix shifting and storage device. Further, cryptographic power is introduced to the system by performing a non-affine substitution operation during a shift operation on segments of information stored in said matrix. The shifting function, as well as the substitution function, is a function of said unique key. The system is further mathematically invertible, that is, the same hardware may be utilized for both encipherment and decipherment by merely reversing the sequence of operations.

15 Claims, 16 Drawing Figures

FIG. 2
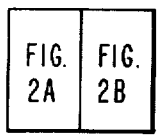
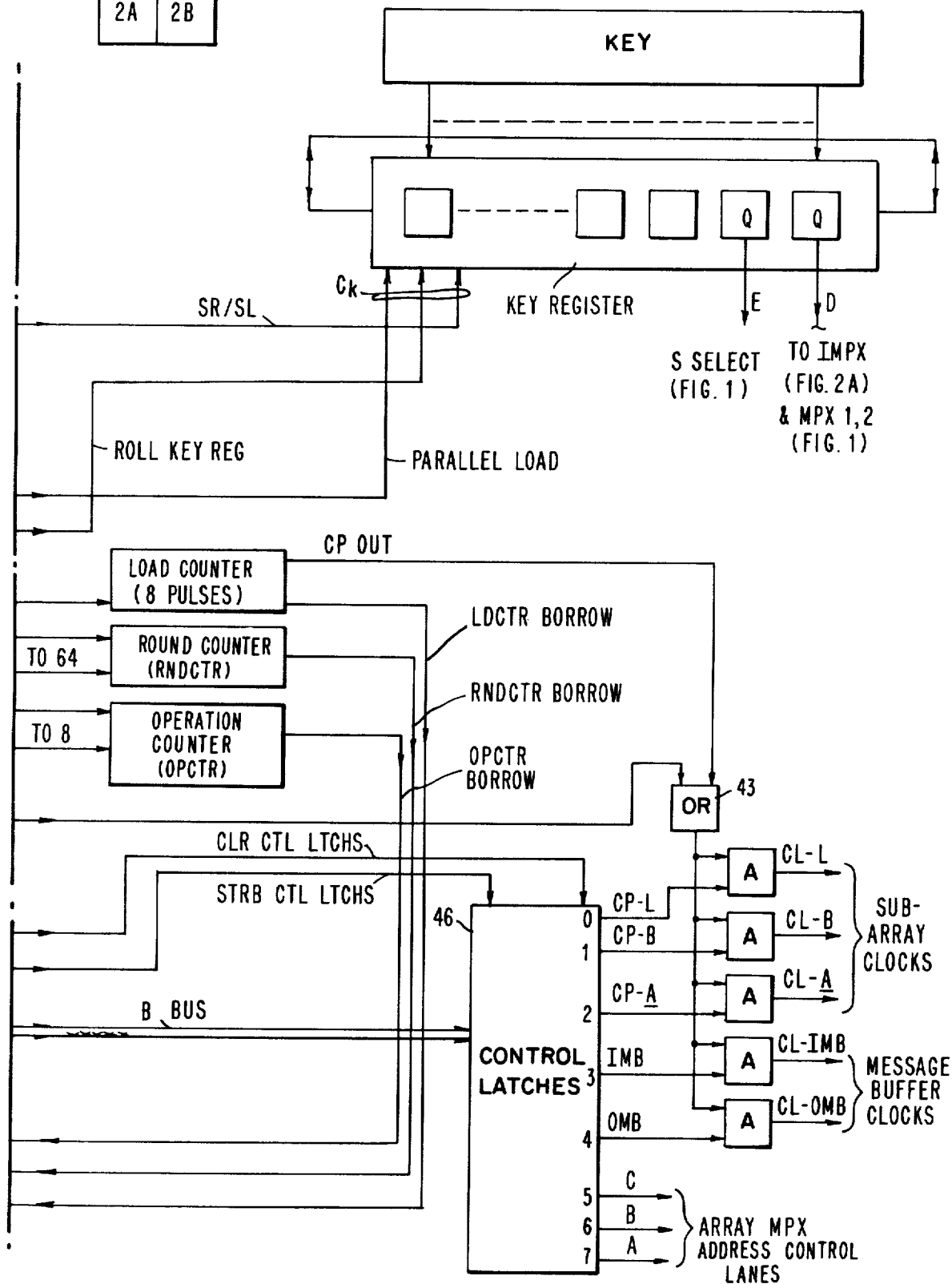
FIG. 2B 8 x 8 ARRAY

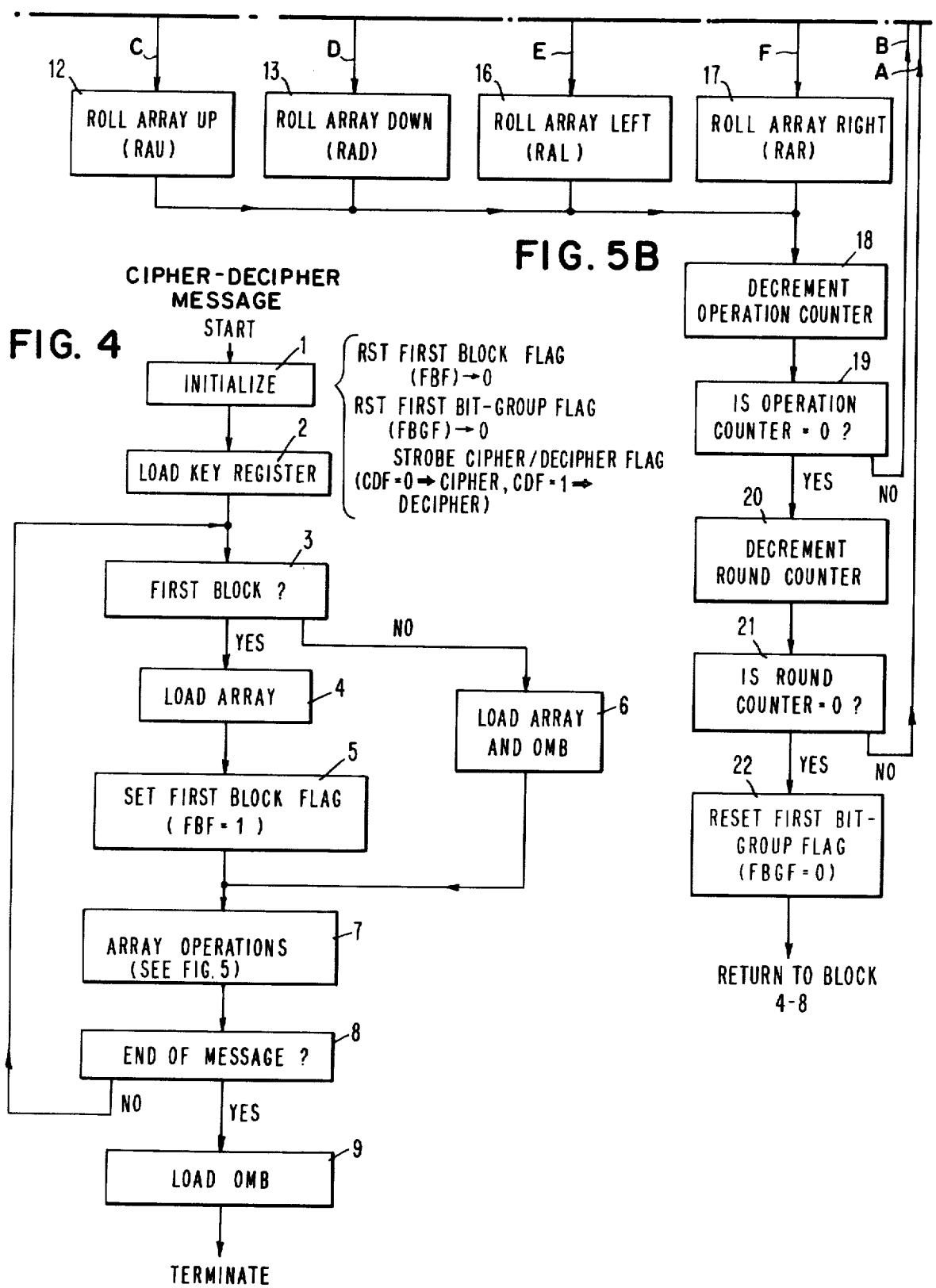

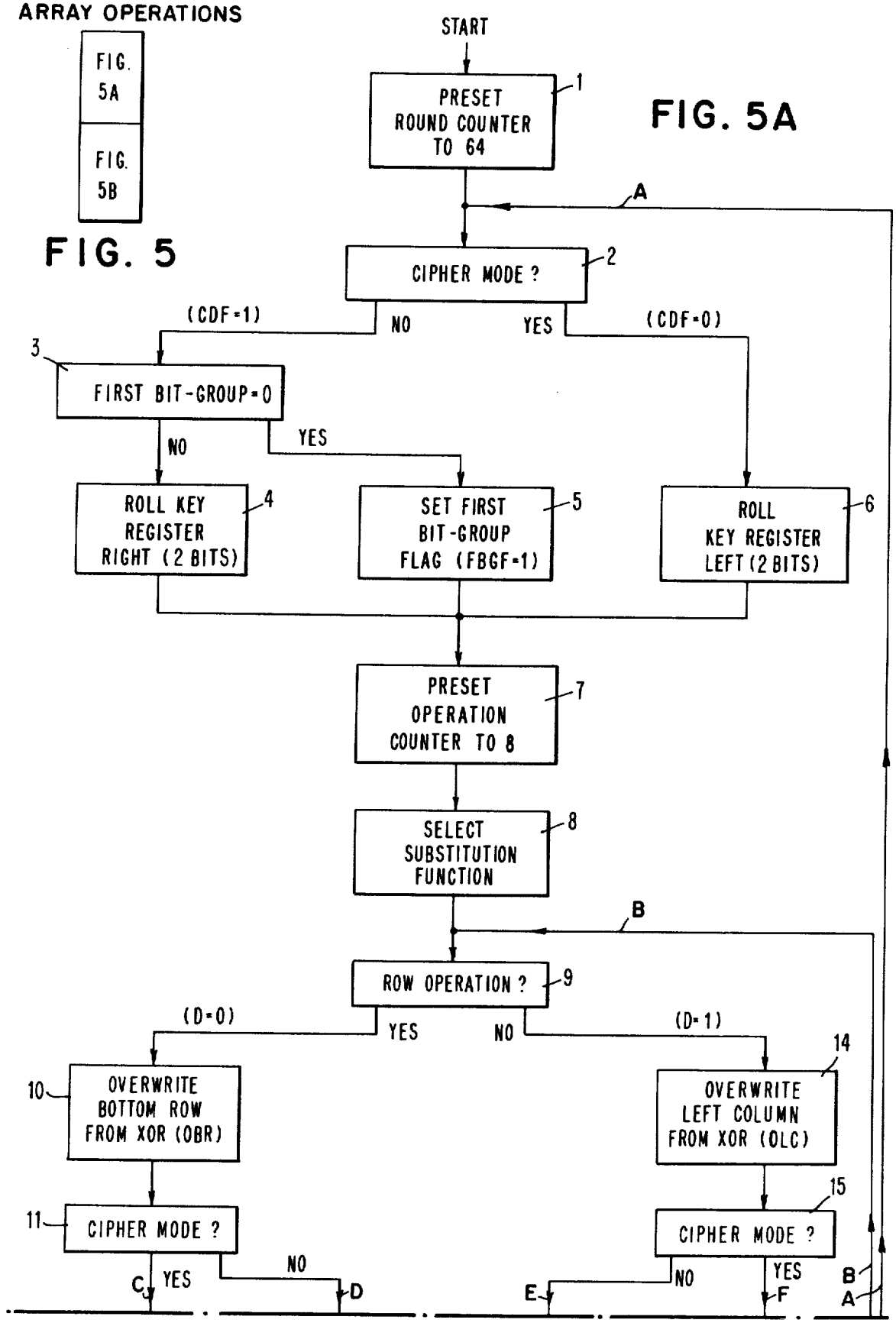

KEY CONTROLLED BLOCK-CIPHER CRYPTOGRAPHIC SYSTEM EMPLOYING A MULTIDIRECTIONAL SHIFT MATRIX

CROSS REFERENCE TO RELATED APPLICATIONS

Reference is hereby made to U.S. Pat. No. 3,798,359, entitled Block-Cipher Cryptographic System; U.S. Pat. No. 3,796,830, entitled Recirculating Block-Cipher Cryptographic System; and U.S. patent application Ser. No. 552,685 filed Feb. 24, 1975, entitled Block-Cipher System for Data Security, all assigned to the same assignee as the present application.

BACKGROUND OF THE INVENTION

There is an increasing need in modern industry for data privacy and/or security. In the communications field, data being transmitted via radio communication or telephone lines is susceptible of interception and unauthorized use or alteration. In the computer industry the unauthorized access to data may be obtained, for example, by accessing various storage devices or intercepting messages being transmitted between terminals or between the terminals and the host of remote-access computer networks. In such networks a large number of subscribers are provided access to "data banks" for receiving, storing, processing and furnishing information of a confidential nature. The need for data security in such systems cannot be too highly emphasized.

Generally, present-day computing centers have elaborate procedures for maintaining physical security at the location where the central processor and data-storage facilities are located. For example, some of the procedures which have been used are: restriction of personnel within the computer center, utilization of mechanical keys for activation of equipment, and camera surveillance. These security procedures, while providing a measure of safety in keeping unauthorized individuals from the physical computing center itself, are not effective with respect to large remote-access computer networks which have many terminals located at distant sites, connected to the central processor by either cable or telecommunication lines.

Some digital techniques have been implemented in computing systems for the purpose of maintaining privacy of data. One such approach is the use of a device generally known as "memory protection". This type of data security technique associates a unique binary key with selected segments of the storage within the central processor. Then, internal to the processor, there are present various protection circuits that check for a match of the binary key during the operation of executable instructions and accesses to sections of storage. This type of security measure is generally ineffective in protecting information within the computing system for unauthorized individuals who have knowledge of the computing system circuitry, and who can devise sophisticated programming techniques for illegally obtaining unauthorized access to data.

In the field of communications, cryptography has long been recognized as a means for achieving security and privacy. Many systems have been developed in the prior art for encrypting messages for maintaining secrecy of communications. For example, one well-known technique which has been used for generating "ciphertext" from "cleartext" messages is of substitution. In systems which utilize substitution, letters or symbols that comprise the clear message are replaced by some other symbols in accordance with a predetermined "key". The resulting substituted message is a cipher which is expected to be secret and hopefully cannot be understood without the knowledge of the secret key. A particular advantage of substitution in accordance with a prescribed key is that the deciphering operation is easily implemented by reverse application of the key. A common implementation of substitution techniques may be found in ciphering-wheel devices, for example, those disclosed in U.S. Pat. Nos. 2,964,856 and 2,984,700, filed Mar. 10, 1941 and Sept. 22, 1944 respectively.

Further teachings on the design principles of more advanced substitution techniques may be found in "Communication Theory of Secrecy Devices" by C. E. Shannon, Bell System Technical Journal, Vol. 28, Pages 656–715, October 1949. Shannon, in his paper, presents further developments in the art of cryptography for expounding the product cipher, that is, the successive application of two or more distinctly different kinds of message-symbol transformations. One example of a product cipher consists of a symbol substitution followed by a symbol transposition.

Another well-known technique for enciphering a clear message communication is the use of a steam-generator sequence which is utilized to form a modulo sum with the symbols that comprise the clear message. The cipher output message stream formed by the modulo sum would then be unintelligible to the receiver of the message, if it does not have knowledge of the stream-generator sequence. Examples of such stream-generators may be found in U.S. Pat. Nos. 3,250,855 and 3,364,308, filed May 23, 1962 and Jan. 23, 1963, respectively.

Various ciphering systems have been developed in the prior art for rearranging communication data in some ordered way to provide secrecy. For example, U.S. Pat. No. 3,522,374 filed June 12, 1967 teaches the processing of a clear message with a key-material generator that controls the number of cycles for enciphering and deciphering. Related to this patent is U.S. Pat. No. 3,506,783 filed June 12, 1967 which discloses the means for generating the key-material which gives a very long pseudo-random sequence. Another approach which has been utilized in the prior art for establishing secret communications is the coding of the message's electrical signal representations that are transmitted over the communications channel. This type of technique is usually more useful in preventing jamming rather than in preventing a cryptanalyst from understanding a cipher message. Exemplary systems of this type may be found in U.S. Pat. Nos. 3,411,089, filed June 28, 1962 and 3,188,390, filed June 8, 1965.

In the area of computer data communications, it has generally been found that product ciphers are superior to other types of ciphering schemes, as discussed in "Cryptography and Computer Privacy" by H. Feistel, Scientific American, Volume 228, No. 5, May 1973, pp. 15–23. Examples of product ciphering systems are disclosed in the two previously referenced U.S. Pat. Nos. 3,798,359 and 3,796,830, as well as the copending application Ser. No. 552,685. These patent references disclose systems for generating a product cipher under the control of the unique user key. With careful selection of the size of the data block and the key size, the probability of ever cracking the cipher becomes extremely small. That is, a cipher becomes impractical to crack by trial of all possible combinations of the key. This is particularly true if the cipher text reveals no information with regard to the unique user key.

The previously referenced block cipher cryptographic systems, especially those utilizing the non-affine transformation of substitution, may be utilized to produce extremely secure ciphers. However, the price which one must pay to produce such a cipher with these systems is the iteration or repetition of the encipherment process a plurality of times. For example, 16 such rounds is often considered the minimum number to produce a cipher of satisfactory security utilizing such systems. It is thus obvious that any cryptographic system which will produce a cipher of equivalent security but requiring less time to achieve same will result in a saving to the user, not only of time, but also of money since a computer must typically be tied up while such encipherment operations are taking place. Thus, any system which is capable of providing a high level of security with minimal expense will greatly facilitate the use of cryptographic systems to implement recently enacted government data privacy laws.

SUMMARY AND OBJECTS OF THE INVENTION

It has now been found that a very secure cryptographic system requiring minimal encryption time may be realized by utilizing a bidirectional shifting matrix wherein data to be enciphered or deciphered is loaded into said matrix and the bidirectional shifting of said matrix is then performed under control of said unique key. Further security may be accomplished by including a non-affine transformation in the shifting cycle, said non-affine transformation being realized as an N bit for N bit substitution. Further, linear or nonlinear transformations may be inserted into the overall procedure to further improve the security of the system.

It is accordingly a primary object of the present invention to provide a key controlled block cipher cryptographic system utilizing a bidirectional shifting matrix.

It is a further object of the invention to provide such a system wherein the operation of said shift register and thus the cryptographic process is a function of said key.

It is a still further object of the invention to provide such a system which includes a non-affine transformation of a subset of data in said shifting matrix during each shifting operation.

It is a still further object of the invention to provide such a cryptographic system wherein the encoding or decoding of a block of data occurs during the successive loading of said data into said bidirectional shifting matrix.

Other objects, features and advantages of the present invention will be apparent from the following description of a preferred embodiment of this system.

DESCRIPTION OF THE DRAWINGS

FIG. 2 comprises an organizational diagram of FIGS. 2A and 2B.

FIGS. 2A and 2B comprise a combination functional and logical diagram of the control section of the encryption system of FIG. 1 showing control circuit detail.

FIG. 4 is a high level flowchart of the overall cipher-decipher operation as performed in the present system.

FIG. 5 is an organizational diagram of FIGS. 5A and 5B.

FIGS. 5A and 5B constitute a detailed flowchart for the operation of the bidirectional shifting matrix and its associated controls.

DESCRIPTION OF THE DISCLOSED EMBODIMENT

The objects of the present invention are accomplished in general by key controlled block-cipher cryptographic system wherein the cryptographic transformation is performed as a function of a unique user supplied key. The system includes a N by N bit shift matrix including means for shifting same in either of two directions as a function of said key. Means are provided for initially loading said matrix with a block of data to be transformed (enciphered or deciphered) and then performing a predetermined number of row and/or column shifts of said matrix under control of said unique key. Means are provided for connecting the output of each row or column to the next adjacent row or column, the end row or column being end-around connected to the first row or column. After a predetermined number of shift rounds the transformation is completed and the entire contents of the shifting matrix is gated out as the transformed block of data.

A high degree of cryptographic security is obtained with the system by inserting a non-affine transformation step in the shifting operation, preferably in the end-around circuitry between said first and last rows and columns. In the present embodiment this non-affine transformation involves an N bit for N bit substitution which in turn is also a function of the user supplied key.

In order to introduce still further cryptographic complexity to the presently disclosed embodiment, when the substitution operation is completed, the transformed byte is not gated directly into the designated row or column of the matrix but rather is exclusive-or'd with the previous contents thereof.

Although the present invention is herein disclosed in a preferred form dictated by many considerations of engineering practicality, it will readily be apparant to those skilled in the art that many modifications may be made on the basic cryptographic transformation concept within the spirit and scope of the invention.

It will be apparent from the above general description of the present cryptographic system that the most important single operation is the selective bidirectional shifting of a data block in the N by N matrix. It should be noted however, that the substitution operation which occurs with every shift is also very important to the cryptographic power of the system as is the exclusive-oring operation when a given row or column is overwritten.

Figure 1:
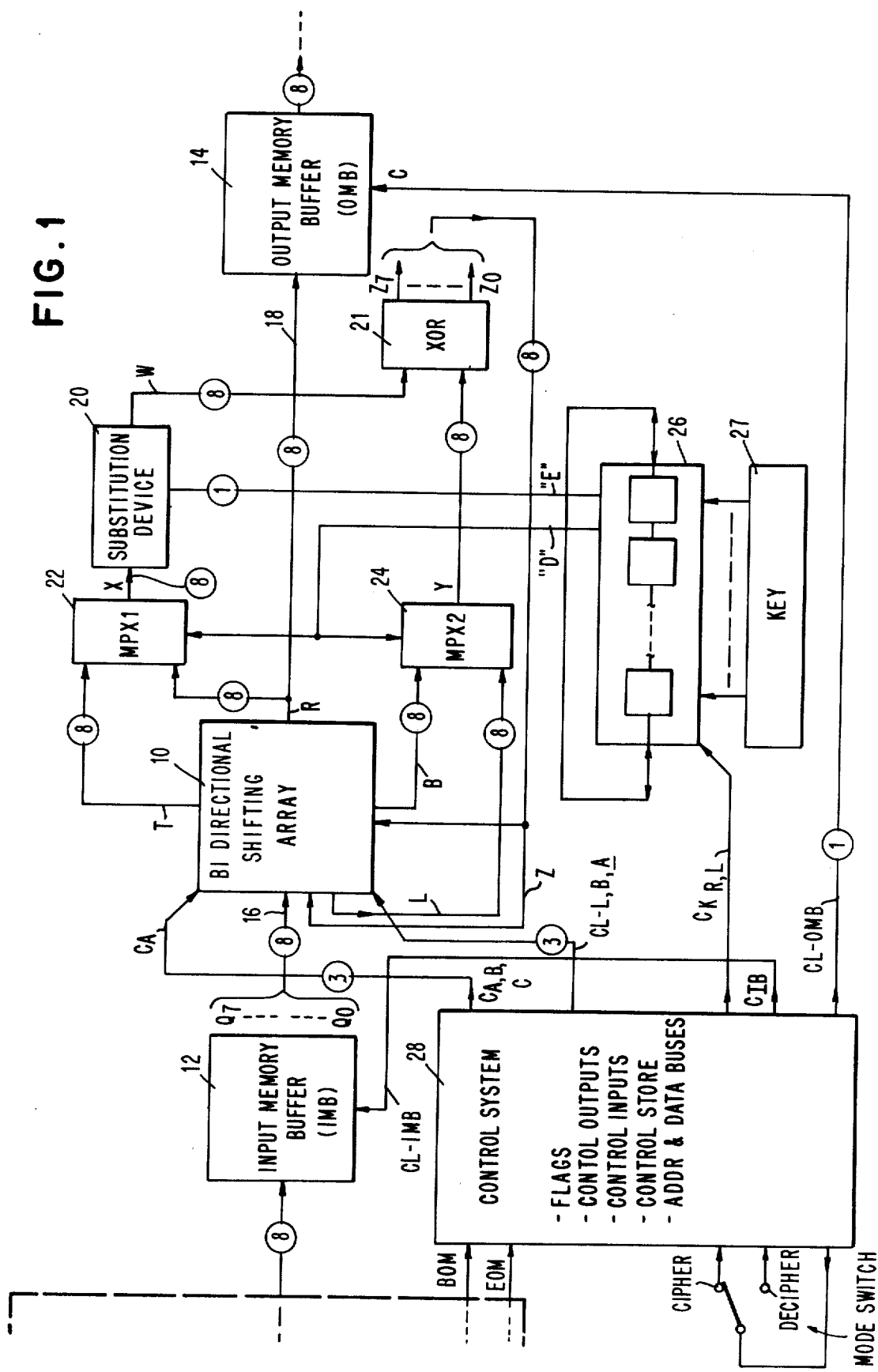
FIG. 1 comprises a functional block diagram of the present cryptographic system.

Referring now to FIG. 1 of the drawings, the bidirectional shifting array 10 is clearly shown in the center of the drawing and conventional input and output memory buffers (IMB, OMB) are shown at 12 and 14. These buffers are connected to load and empty the array via the eight bit cables 16 and 18 as will be well understood. In the present embodiment 64 bit data blocks are assumed and it is further assumed that these are available as 8 bit bytes. To load the array, 8 bits are loaded in parallel to the left edge thereof and 8 shifting operations occur to the right until all 64 bits are loaded. Thus, the 8 columns of the array are loaded in eight successive operations. This operation is disclosed later utilizing the microprogram mnemonic LDA (load array). The array is unloaded into the output memory buffer 14 in exactly the same manner, i.e., 8 bits at a time until the transformed 64 bits stored in the array after a particular system transformation operation are loaded into the buffer 14. The substitution device is shown as block 20 in the figure and is essentially a mapping table or memory which takes an 8 bit input and produces an 8 bit output depending upon the 8 bits in the top or right-hand edge of the array and the particular key bit E. Thus, the 8 bits of the data byte going into the substitution device through the multiplexer 22 and the key bit E allow a selection of any one 512 possible bit configurations in the 8 bit output from this substitution device. This substitution is considered a non-affine substitution in that there is no discernable logical relationship whatsoever between the data content of the 8 bit output and the data content of 9 bit input selection pattern. The addressing means for such a substitution device would be obvious to those skilled in the art, it being understood that the actual bit pattern configurations stored in the device are completely arbitrary and could be readily changed. However, it is obvious that for a given system to be able to decipher and encipher a particular message, the substitution device would have to be identical for both encryption and decryption operations. The two multiplexers MPX 1 and MPX 2 designated by the referenced numerals 22 and 24 merely select one of two possible input patterns under control of the D field from the key register 26. For example, if "row" shifting is being done, the top and bottom edge of the array are selected as inputs to the substitution device 20 and exclusive-or 21 by the two multiplexers 22 and 24. Conversely if "column" shifting is being done the outputs from the left and right edge of the array are selected by these two multiplexers.

The exclusive-or block 21 takes the 8 bit output W from the substitution device 20 and the output Y from the multiplexer 24 and performs an exclusive-or operation producing in turn an output Z. This output is in turn fed into either the bottom edge or the left edge of the array, depending again on whether a "row" or "column" shifting operation is being performed in a given instance.

The key register 26 receives a unique user supplied key, 27 so indicated on the drawing which may be readily changed by a user, according to some prearranged schedule. It will of course be understood that it is necessary for the same key to be utilized for both encryption and decryption, if a proper decipherment is to be obtained. The key register 26 which is also shown in FIG. 2B contains a number of cells which in the present embodiment are each capable of storing two bits since these are all the bits that are required for a given round. One bit designated D is utilized to determined whether a row or a column shift is to be performed and the other bit designated E is utilized in the previously described substitution function. It will of course be readily understood that the basic system does not require the E field for successful operation, however, this does increase the security of the system. Additionally, more key fields could be provided in connection with the substituion operation to add still further security to the system.

The block marked control system provides the various timing pulses and clock control signals for performing the encryption and decryption operations within the overall system of FIG. 1. The details of the control system are shown in FIG. 2 (2A and 2B) which is a combination functional block and logical schematic diagram.

The control system 28 produces the various timing and control pulses for operating the overall system. These include the various flags, signals for controlling the inputting of data into and out of the array and gating data within the array during the cryptographic transformations. The control system includes a control store or read only memory which actually produces the microprogram sequences from which the control signals which perform various control operations are derived. All of the address and data buses are loaded and controlled by the control system to route data in the required manner in the system.

Thus the control system determines when the array is to be initially loaded with new data to be either enciphered or deciphered and, when the transformation operation is complete, must determine when the data are to be gated from the array into the output registers. Similarly it must control the actual shifting operations within the array and provide the various multiplex control pulses to control the interconnection of the various elements in the array to obtain the required shifting. Finally, it must maintain continuous control of and monitor these operations so that the required number of individual rounds is performed as well as the individual operations in a round.

Detailed operations of the system will be set forth and described subsequently in the specification, especially with reference to the high level flowcharts of FIGS. 4 and 5 and the subsequent general description of the microprogram sequence list.

Before proceeding further with a detailed description of the operation of the present hardware embodiment of FIG. 2, certain definitions and terminologies utilized in the array 10 will be explained with reference to FIG. 3. Subsequently a brief description of a complete rolling or shifting operation will be described for an encipherment and then a decipherment round utilizing FIGS. 6A and 6B.

Figure 3:
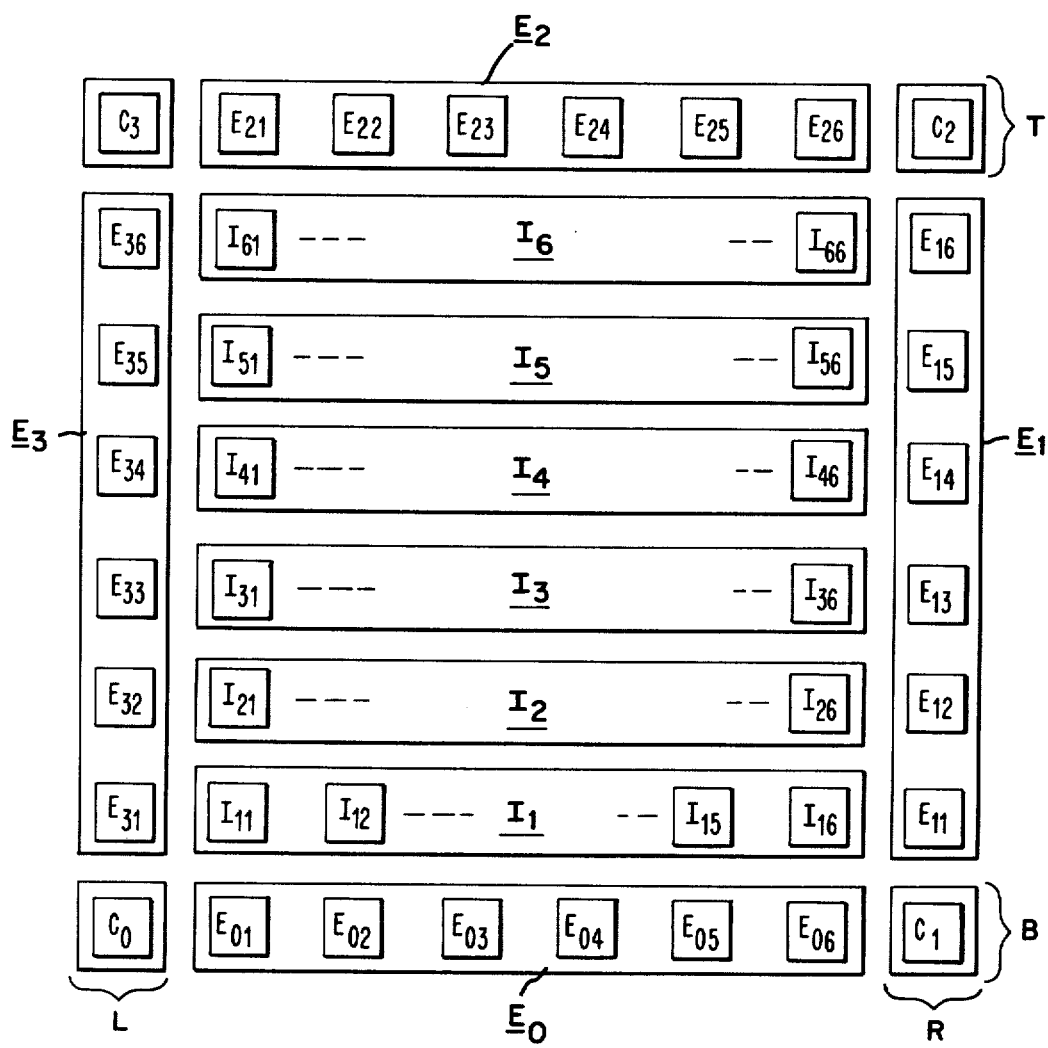
FIG. 3 is a diagram showing the cell nomenclature for the individual storage cells of the bidirectional shifting matrix.

Referring specifically to FIG. 3 an 8 bit by 8 bit array is disclosed. Each and every storage cell or element within the array is specifically denoted with a letter and a subscript which indicates the cell class as well as its specific location. This specific notation is utilized in the subsequent interconnection Table 4 for a given operation being performed and a given cell position. Using this table it may be readily determined from which cell another cell receives its input. The designations have been used for convenience of reference since certain of the cells are far more active or, stated differently are treated uniquely in various situations. The cells in the edges of the array are quite active. These are denoted by $E_0$–$E_3$ and include the four corner cells $C_0$–$C_3$. Depending on the particular operation involved it is these edges from and into which data is loaded into the array, gated into the substitution block 20, and the exclusive-or block 21 and from the exclusive-or block as the vector Z. Referring to FIG. 3 it will be noted that the various corner cells ($C_0$–$C_3$) are in two edges. Thus the cell $C_0$ is in the left edge (L), and also in the bottom edge (B). The output data byte consisting of 8 bits from each of these four edges is shown on the cables coming out of the array 10 shown in FIG. 1 and denoted by the four letters, R, B, L, and T. The interior cells $I_1$–$I_6$ operate in pretty much the same manner in all operations, that is they feed data into one of four adjacent cells or conversely receive data from one of four adjacent cells. The edge designations mentioned previously, i.e., R, B, L, and T are shown on both FIG. 3 and FIG. 7 (7A–7D).

The following Table 1 specifies the membership of each of these edges of the array 10 in terms of the cells included therein.

TABLE I

| CELL-CLASS | ELEMENTS |
| --- | --- |
| Left Edge L | $C_0$, $C_3$, $E_3$. |
| Top Edge T | $C_2$, $C_3$, $E_2$. |
| Bottom Edge B | $C_0$, $C_1$, $E_0$. |
| Right Edge R | $C_1$, $C_2$, $E_1$. |
| Entire Array A | All Cells |
| L and B = A | $I_1$, $I_2$, ..., $I_6$, $E_1$, $E_2$, $C_2$. |

In the above table the first four lines are believed to be self-explanatory. The fifth line denoting the entire array A is similarly self-explanatory. The sixth line defines the group of cells A as the entire array (A) less the cells of the bottom and left edges. For purposes of the present embodiment a clock pulse series CL-L, CL-B, and CL-A are specified to activate subsets of desired elements of the array for the various operations. In certain instances it is desired to isolate the operation of the left edge L and the bottom edge B and accordingly circuitry is provided for doing this. For edge operations R and T, it is sufficient to activate the entire array and accordingly corresponding clock pulses CL-R and CL-T are not required.

Figure 7C:
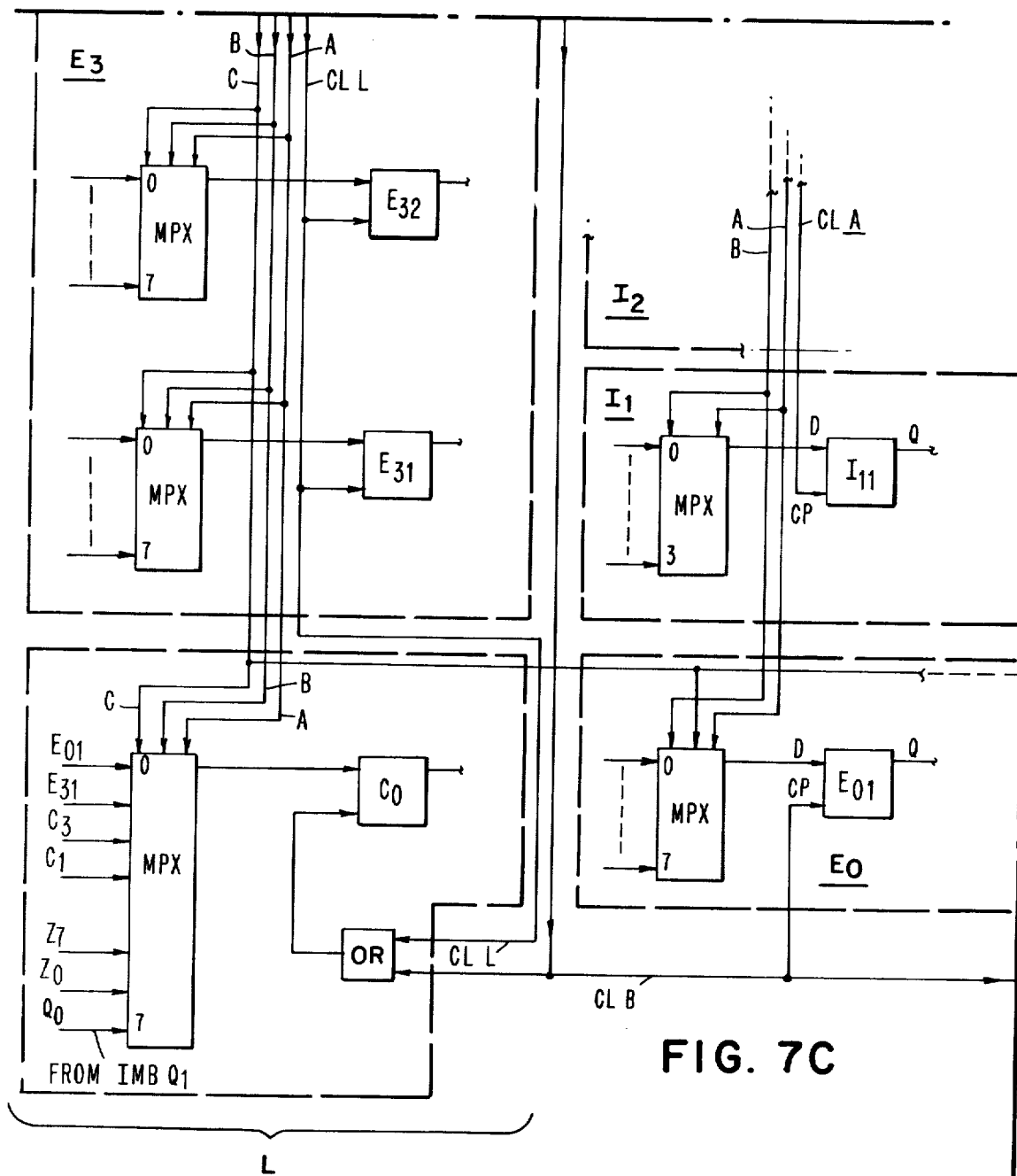
FIGS. 7A through 7D constitute a detailed logical schematic diagram showing circuit details for exemplary individual storage cells of the bidirectional shifting matrix.
Figure 7:
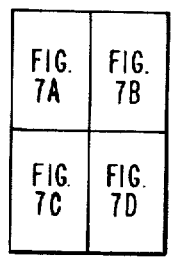
FIG. 7 is an organizational diagram for FIGS. 7A through 7D.

Before proceeding with a specific detailed operation of the system with respect to the flowcharts of FIGS. 4 and 5 and the specific hardware of FIGS. 2 and 7, there will now follow a general description of the cryptographic algorithm insofar as the operation of the bidirectional shift register or array is concerned.

As stated previously, the array is first completely loaded with a complete block of data to be transformed (either encrypted or decrypted) and the unique user key is loaded into the key register provided therefor. At this point the transformation process begins. First a predetermined key bit is examined and depending upon whether the key is a 1 or a 0, either a column or a row shift will occur. It should be clearly understood that the row or column shift which occurs is not merely a single row or column shift but a complete rotation of the contents of the array in either of the two specified directions. Thus, if there are eight rows and columns as in the present embodiment where the array comprises an eight by eight matrix there must be eight individual shifting or rolling operations for a cycle or a round to be completed.

It is also obvious that something must happen to the data between shifts or at the completion of a round the register would be identical to its appearance at the start.

In the present embodiment, two transformation functions occur during the shifting or rolling operation. The first is a substitution transformation and the second is an exclusive-or with the contents of the row or column position into which the substituted data byte is combined. Thus, as many shifts occur utilizing this transformation characteristic as is necessary to complete a round.

Figure 6A:
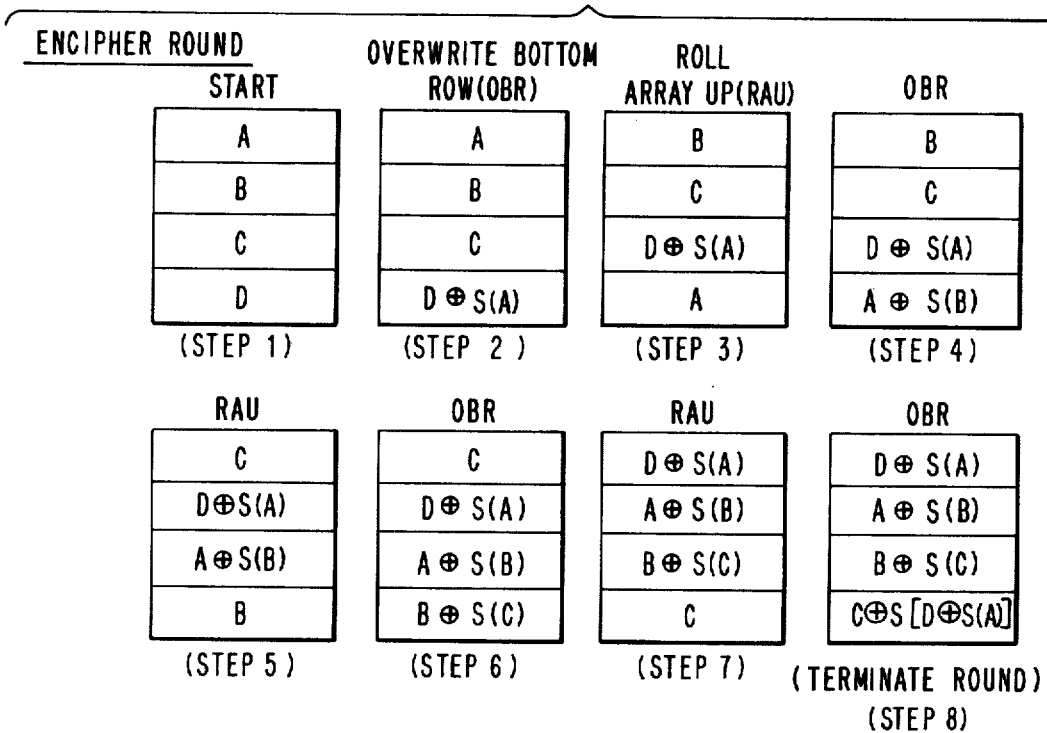
FIGS. 6A and 6B illustrate diagrammatically the operation of the present encryption system during a round of encipherment and decipherment respectively.
Figure 6B:
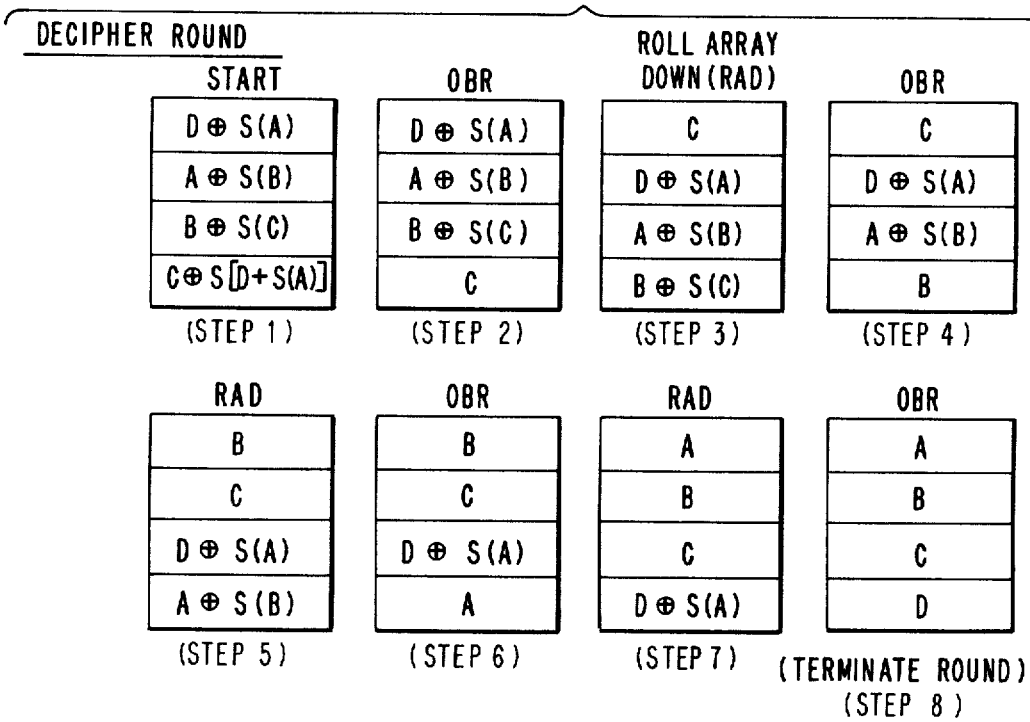

At this point, reference should be made to the example of FIGS. 6A and 6B which illustrate diagrammatically what happens to the contents of the array during an encipherment and a decipherment round, respectively. This figure represents a row shifting operation, it being clearly understood that a column shift would operate in exactly the same way except that the rolling or shifting would be orthogonal to the row shifting disclosed.

Referring now to FIG. 6A it will be noted in the box marked step 1, that the four rows, each contain a letter. This letter represents the original binary data format. It should be noted of course, that only four rows are shown in the present example, although in the embodiment there are eight rows disclosed in the shifting array. The first operation that occurs between step 1 and step 2 is the extraction of the data represented as A and the passing of this data through the substitution step. This procedure forms S(A). This latter expression indicates that a new data byte has been obtained from the substitution step, which is a function A. This new data byte is in turn exclusive-or'd with a binary value D previously stored in the lower row of the array. This new total byte which is stored during step 2 is represented as D $\oplus$ S(A). In step 3 the array is rolled up by one row and the data represented as B passed through the substitution box and in step 4 exclusive-or'd with the quantity A which was in the bottom row as a result of step 3, to produce the new bottom row content A $\oplus$ S(B). This process continues until step 8 which is the last operation in the round. At this point the bottom row becomes C $\oplus$ S(D $\oplus$ S(A)). Thus the content of the bottom row is actually a double substitution function.

FIG. 6B illustrates the reversibility of this process. Thus, in step 1 of the decipher round the substitution function is taken of the upper row which operation produces the term S(D $\oplus$ S(A)) which is the second term of the quantity C $\oplus$ S(D $\oplus$ S(A)) currently resident in the bottom row. These two quantities are exclusive-or'd together with the result that the two substitution functions cancel out leaving the value C which is written into the bottom row in step 2. The array is now rolled down since this is a decipher function and the new content of the array as shown in step 3 has the value C in the upper row which again is passed through the substitution step and exclusive-or'd with the bottom row of the array to produce the resultant value B as shown in step 4. This operation continues through step 8 and it will be noted that the final content of the array at the termination of the decipherment round is identical to that at the start of the encipherment round.

It will be clearly understood that this example constitutes only one round of encryption which is performed on a given block of data and that there are in reality many such key-controlled rounds performed, each one of course, being dependent upon the particular key bit interrogated. In the present embodiment there are 64 such rounds. However, the precise number would depend upon the degree of cryptographic security required.

The above example illustrates how, with a given round, the decipherment produces the original data from an encipherment starting point. However, it will of course be obvious that an identical key bit must of necessity be present in the key register at the time of decipherment, as for encipherment. This is illustrated, by way of example, in the following Table 2 wherein each of the four numbers represent a byte of key, it being presumed in this case that there are four bytes which would produce four transformation rounds. In actuality of course, and in the specific example there are many more than four such rounds. However, to proceed with the example set forth in Table 2 the rolling or advancing of the key register with successive rounds of encryption proceeds as illustrated. This table is organized like FIGS. 6A and 6B and broken into two sections, one for encipherment and the other for decipherment. It should be clearly understood that the key rolling concept illustrated in Table 2 occurs on a round basis rather than an operation basis as with the previously described example illustrated in FIG. 6. Thus once a key byte (2 bits E and D) are at the access position of the key register they remain there until a round is completed, that is, a complete rolling operation of the array.

The hardware for accomplishing the shifting of the key register will be described subsequently. The right-hand or grid portion of the table indicates the actual key bytes which would be in the key register at any given time position. Each of the numbers as stated previously represents a key byte but in this particular embodiment comprises two bits. Although only four bytes are shown in the example, the disclosed embodiment would normally require sixty-four such bytes or one hundred twenty-eight total bits, since there are sixty-four array rounds utilized.

Referring to the figure, the upper row represents the initial state after loading of the key register with the user supplied unique binary key. During an encipherment operation, the first thing that occurs is that the key register is rolled left (RKL). With the key register in this first permuted position, the first array permutation occurs. Subsequent to this the register is again rolled followed by further permutation etc. until the terminal configuration of the key register occurs (bottom row) which, it will be noted, is the same configuration that the register started with.

TABLE 2

KEY REGISTER SEQUENCING (EXAMPLE)

ENCIPHER

| 1 | 2 | 3 | 4 | • LOAD KEY REGISTER |

| 2 | 3 | 4 | 1 | • ROLL KEY REGISTER LEFT (RKL)<br>• DO ROUND 1 (with Bit Group 1) |

| 3 | 4 | 1 | 2 | • RKL<br>• DO ROUND 2 (with Bit Group 2) |

| 4 | 1 | 2 | 3 | • RKL<br>• DO ROUND 3 (with Bit Group 3) |

| 1 | 2 | 3 | 4 | • RKL<br>• DO ROUND 4 (with Bit Group 4) |

TERMINATE

DECIPHER

TABLE 2-continued

KEY REGISTER SEQUENCING (EXAMPLE)

| 1 | 2 | 3 | 4 | • LOAD KEY REGISTER |

| 1 | 2 | 3 | 4 | • [No Shift]<br>• DO ROUND 1 (with Bit Group 4) |

| 4 | 1 | 2 | 3 | • ROLL KEY REGISTER RIGHT (RKR)<br>• DO ROUND 2 (with Bit Group 3) |

| 3 | 4 | 1 | 2 | • RKR<br>• DO ROUND 3 (with Bit Group 2) |

| 2 | 3 | 4 | 1 | • RKR<br>• DO ROUND 4 (with Bit Group 1) |

TERMINATE

Upon each successive round it will be noted that the key register is rolled or shifted to the left with the end bit being moved around to the right most or interrogation position.

On the decipherment transformation the system must use the initial loading of the key register without rolling for the first decipherment permutation. This is indicated clearly in the right-hand portion of the table. In the hardware this is accomplished by setting the first-bit-group flag in a deciphering transformation which prevents the initial rolling of the key register such as occurs during an initial encipherment round. As with encipherment, with each round, the key register is shifted but in the opposite direction with the result that the key is applied in the reverse order which, as will be apparent, is necessary for a proper decipherment of an encrypted message.

It may thus be seen that by operating the key register in the manner described with respect to Table 2, a proper ordering or accessing of the key register occurs automatically for encipherment and decipherment to maintain the proper order of presentation of the key material. Further, although only four bit groups are shown in the Table, the operation would be identical regardless of the number of bit groups utilized insofar as the shifting of the key register between rounds is concerned.

Having thus generally described the operation of the system with respect to the rolling of the bidirectional shifting matrix or array 10 and the rolling or shifting of the key register 26, it is believed that the basic transformation concept utilized in the present system is apparent. Further, the reversibility of the algorithm and hardware has been clearly demonstrated in the above example and description. The remainder of the description will be directed to the description of the flowcharts which indicate the specific function performed by the hardware and finally a description of the system hardware itself, especially as set forth in FIGS. 2 and 7.

What must be accomplished by the hardware is when a block of data is received which must be transformed, it must first be determined whether or not it is to be enciphered or deciphered. Next the data must be appropriately loaded into the bidirectional shifting matrix or array 10 and then the transformation operations must proceed under control of the user supplied key. The number of transformation rounds are predetermined and the array must be appropriately shifted together with the performance of the substitution and exclusive-or operations in the proper sequences together with the rolling of the key register as appropriate. In addition, the number of rounds performed must be continuously monitored so that the proper number are performed and finally the transformed block of data must be gated out of the matrix.

As is apparent from the above description, the primary functional units of the present system are the bidirectional shifting array 10, the substitution device 20 together with the addressing circuitry therefor which performs the substitution, the exclusive-or block 21 and the shiftable key register 26. The control system 28 basically controls the shifting access (i.e., multiplexer control) and shifting direction of the array, the shifting direction of the key register 26 and the gating of data around the various data paths making up the system. The control system 28 will be more specifically described with reference to FIG. 2 (2A and 2B) subsequently, however, it essentially comprises a read only memory 40 with series of microprogram sequences stored therein and various decoders, branch condition tests, setable control latches, etc., which are operable in conjunction with the output of said microprogram sequences to effect the required control operations of the system. The functions of the microprogram sequences will be apparent from the following description of FIGS. 4 and 5, however, in addition a list of microprogram sequences is included subsequently in the specification.

Referring now to FIG. 4, which is a high level, overall flowchart for the operation of the system, a start signal which could be an operator controlled button, switch etc. initializes the system, which causes a flag in the system to be set indicating that the first block of data is ready to be transformed, i.e., is a new message. Additionally, a first bit group flag (FBGF) is set in case a decipher operation is being performed, since, as indicated previously, with a decipher the rolling of the key register must be inhibited during the first decipherment round. Finally, a cipher/decipher flag must be set to indicate whether the operation to be performed is encipherment or decipherment. This would normally be done by the system testing an operator controllable switch.

The system then proceeds to block 2 entitled "Load Key Register", which causes the unique user key to be gated into the shiftable key register 26.

The system then proceeds to block 3 of the flowchart, wherein a test is made as to whether this is the first block, or the beginning of a message, to be transformed by the system. If the answer is "yes", the system proceeds to block 4 entitled "Load Array", wherein the new block of data is transferred from the input memory buffer 12 into the array 10.

Block 4 proceeds to block 5 which causes the previously reset first block flag to be set to a one so that the system will know that the next round is not a first block operation, so that the system can proceed to block 6 via the test made at block 3.

If the test in block 3 had resulted in "no", the system would have proceeded to block 6, which in addition to loading the array 10 with a new block of data to be transformed, would concurrently cause the current contents of the array to be gated to the output memory buffer. The contents of the array would have been transformed by the preceding array operation. The output of blocks 5 and 6 proceed to block 7 entitled "Array Operations". The details of the array operations are covered in FIG. 5 to be described subsequently and basically cover the actual cryptographic transformation which occurs within the system. At the end of an array operation the system proceeds to block 8 wherein a determination is made as to whether the block just transformed was the last block of the message or not. If not, the system returns back to block 3; if so, it proceeds to block 9 and causes this last transformed block of message data to be gated out into the output memory buffer 14 and terminates the cryptographic transformation operation.

FIG. 5 which comprises FIGS. 5A and 5B, comprises a medium level flowchart of the operations which occur in the present system for performing a cryptographic transformation on an individual block of data which is gated into the bidirectional shifting array 10. The operations performed in the flowchart of FIG. 5 are those alluded to as "Array Operation" in block 7, FIG. 4. It will be understood that the start point of the flowchart on FIG. 5A and the terminate point of the flowchart on FIG. 5B represent the entrance and exit portions, respectively, of block 7, FIG. 4.

Before proceeding with the explanation of FIG. 5, several terms should be redefined for clarity. A "round" is a complete rolling or shifting of the shifting array to reconstitute all of the rows or columns thereof as was described previously with respect to the examples of FIGS. 6A and 6B. The actual number of rounds is discretionary with the system designer although generally the more rounds the greater the cryptographic power of the system. In the present embodiment sixty-four such rounds are utilized which requires that the round counter be set to 64 upon initialization of the system and, each time a round is completed, the counter is decremented until it finally reaches zero, signifying the completion of the "array operation". Also, as described previously with respect to FIG. 6, a number of "operations" must be performed each time a row or column is transformed and the array is shifted. In the example of FIG. 6A these operations are shown as taking two steps for purposes of description, however in the present embodiment, each such reconstitution or transformation of a given row or column of the array and the requisite shifting is performed in a single "operation". Accordingly, since the array of the present embodiment contains 8 rows and 8 columns, the complete round involves 8 operations which necessitates an "operation counter" being utilized to control this function which is set to eight initially at the beginning of a round and decremented as each operation occurs.

To proceed now with the description of an array operation as shown in FIG. 5, block 1, entitled "Preset Round Counter to 64", as previously explained causes the round counter shown in FIG. 2B to be reset to sixty-four. The system then proceeds to block 2, where a determination is made, by testing the status of the C-D flag, whether the system is in a cipher or decipher mode. If the mode switch is set to decipher, the system branches to block 3, wherein the first bit group flag is tested. If it is set to a "0" the system branches to block 5 which causes the first rolling of the key register to be deleted as will be remembered in the previous description of Table 2. Block 5 also causes the first bit group flag to be set to a "1" so that the next round will cause the system to proceed to block 4 rather than block 5 wherein the key register is rolled to the right. If the test in block 2 had caused the system to branch to block 6 this would have indicated a cipher operation and block 6 would have caused the key register to be rolled to the left again, as explained with reference to Table 2. The system, regardless of any of the above three branches, now proceeds to block 7, since this path is entered only at the beginning of a round, the operation counter is initially preset to numeral 8.

The system then proceeds to block 8 wherein the initial substitution function is selected as a function of the "E" field of the key register. It will be understood that the remainder of the substitution function is selected as a function of the actual bit configuration of the row or column of the array which is gated to the substitution block. The function of block 8 is to cause this byte to be gated to one of two possible substitution matrices. At this point the system proceeds to block 9 wherein the setting of the "D" field of the key register is interrogated to determine whether it is a row or column operation, if a row operation, in the present embodiment, "D" would have been set to a "0" and vice versa. Assuming a row operation, the system proceeds to block 10. What actually occurs at this point between blocks 9 and 10 is the automatic gating of the data byte in the top (T) or right (R) edge of the array into the substitution device 20, through the multiplexer 22. Concurrently, the data byte in the bottom (B) or the left (L) edge is gated into the exclusive-or 21 through multiplexer 24. The other input to the exclusive-or 21 is the output W from the substitution device 20. In turn the output Z from the exclusive-or 21 is caused by block 10 to be over written into the bottom row, (B). The system then proceeds to block 11 wherein the C-D flag is again interrogated and, depending on the operating mode of the array, is caused to roll up in block 12 or down in block 13. Returning briefly to block 9, if the column operation were to be performed the system would have branched to block 14 with the same result as the branch to block 10. In other words, the proper output Z from the exclusive-or 21, this time based on a column operation, would be gated into the left column (L) or edge of the array 10. In block 15, the C-D flag is tested, if a decipher operation, the system branches to block 16 which causes the array to be rolled to the left. If the cipher mode is being performed the system branches to block 17 which causes the array to be rolled to the right. The output of blocks 12, 13, 16 and 17 (only one of which can be entered during any one cycle) all proceed to block 18 which causes the operation counter to be decremented. The setting of the operation counter is tested in block 19 and if it is not set to "0" (from eight) the system branches back to block 9 and the interim loop is repeated until the operation counter goes to "0" at which point the system proceeds to block 20. This means that a complete row or column shifting operation is completed and that the round counter may be decremented in block 20.

Block 21 causes the round counter itself to be interrogated and if it is not set to "0" (from 64) the system returns to block 2 and a new round is begun with an appropriate shifting of the key register. The system thus repeats itself until the round counter is finally set to zero indicating that all rounds of encryption have been completed and thus the current block has been cryptographically transformed. At this point the system proceeds to block 22 wherein the first bit group flag is reset to zero (to allow proper operation of the system in the decipher mode). The output of block 22 returns the system control to block 8 of FIG. 4.

Figure 7A:
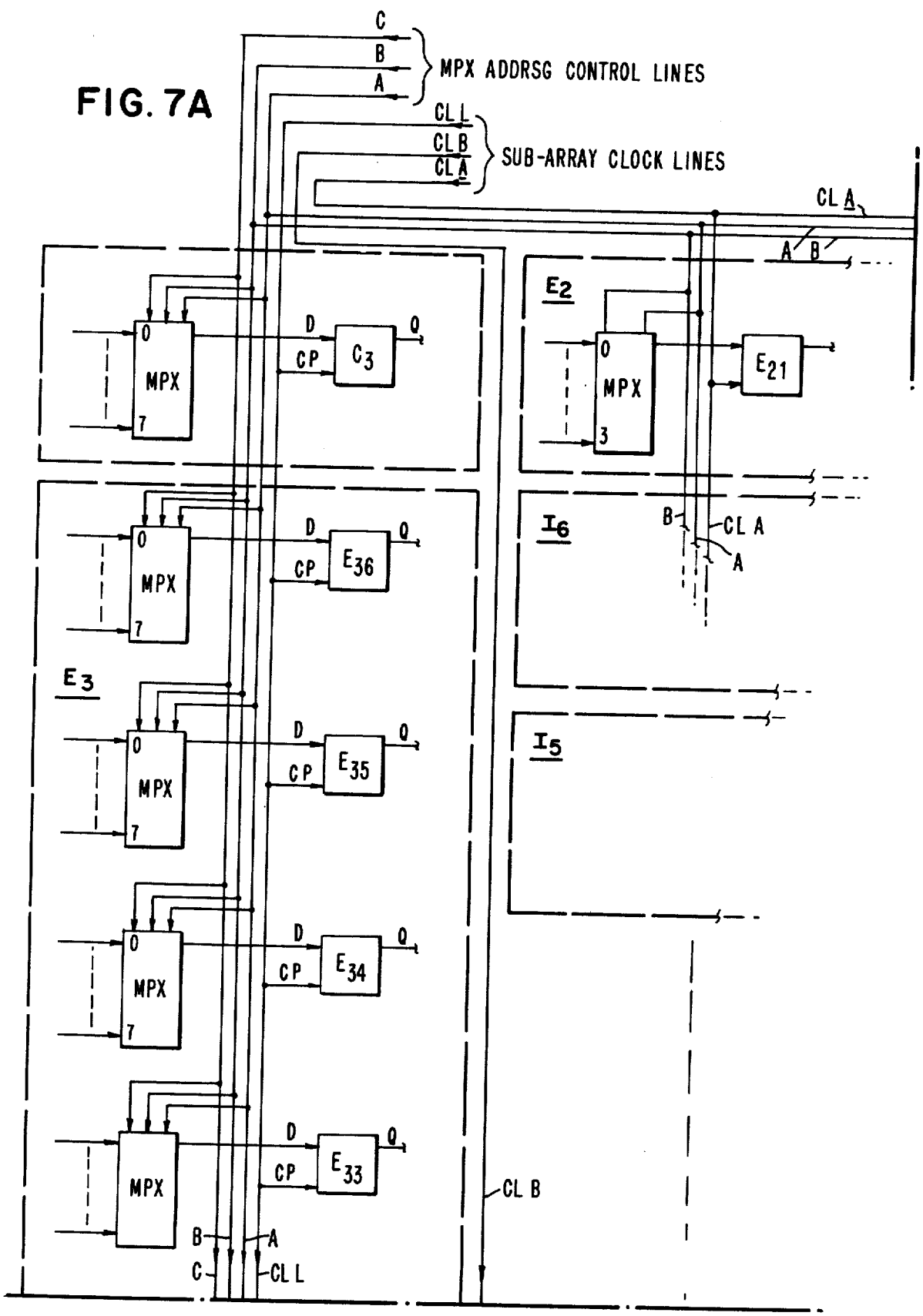
Figure 7B:
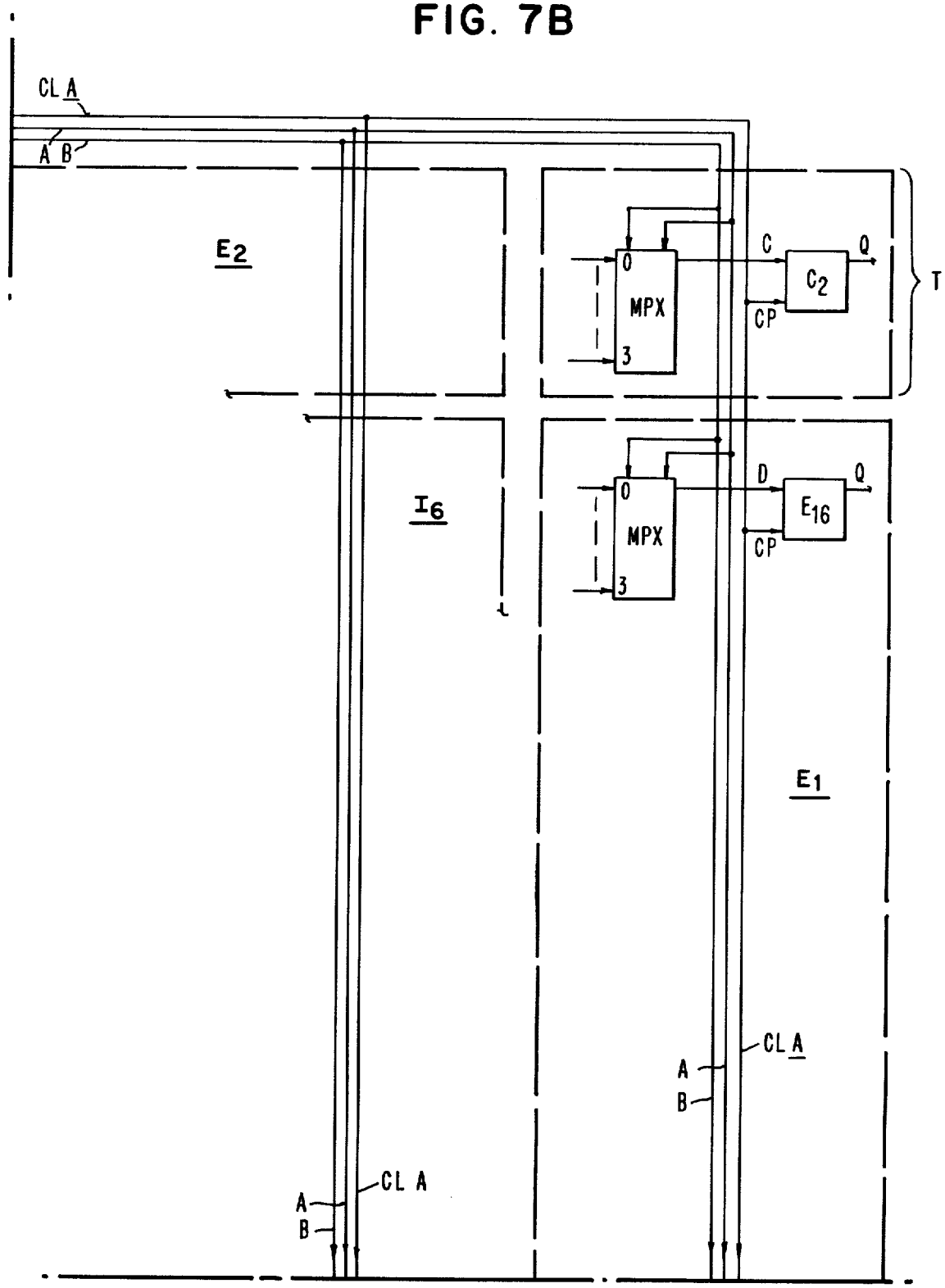

Having thus described the flowchart of FIGS. 4 and 5 the overall operation of the system and the functions which are performed thereby will be clearly understood. The specific hardware means by which these functions are performed, especially in the bidirectional shifting array 10, will be clearly understood from the following description of the preferred embodiment of said array which is shown in FIGS. 7A through 7B (FIG. 7). The description of FIG. 7 together with the array operations and controls of Table 3 and the cell-multiplexer input assignments of Table 4 will clearly indicate how the bidirectional shifting matrix operates. Referring to FIG. 7 each of the actual storage cells utilizes the same cell nomenclature or designation as that used in the previous description of FIG. 3. Thus, the four corner cells are $C_0$ through $C_3$, the edge cells area $E_0$ through $E_3$ and the interior row of cells are $I_1$ through $I_6$. FIG. 7 shows complete line details including multiplexers for all eight cells of the left edge L of the array an exemplary number only, of the other four edges and one of the interior row cells $I_{16}$. It is believed that this diagram together with Table 4 will very clearly indicate all of the required multiplexer input connections for every cell in the array. Further, reference to Table 3 will indicate which of the possible inputs to a given cell must be selected for each of the eight possible array operations. As mentioned previously, each of these cells of FIG. 7 has its own input multiplexer (MPX). Certain of these cells require larger multiplexers, i.e., all of the cells of the left column and bottom row have eight possible inputs, although all eight are not necessarily used. This is to allow the selection of a desired input for a particular cell from among a relatively large number of possiblities which are determined by the particular array operation being performed.

TABLE 3

| ARRAY OPERATIONS | MNEMONIC | MPX ADDRESS | | | ARRAY CELL-CLASS | | | | | | | | SUB-ARRAY CLOCKS | | |
|---|---|---|---|---|---|---|---|---|---|---|---|---|---|---|---|
| | | C | B | A | $C_0$ | $C_1$ | $C_2$ | $C_3$ | $E_0$ | $E_1$ | $E_2$ | $E_3$ | $I_{1-6}$ | L | B | A |
| ROLL ARRAY LEFT | RAL | 0 | 0 | 0 | R | R | R | R | R | R | R | R | R | x | x | x |
| ROLL ARRAY DOWN | RAD | 0 | 0 | 1 | T | T | T | T | T | T | T | T | T | x | x | x |
| ROLL ARRAY UP | RAU | 0 | 1 | 0 | B | B | B | B | B | B | B | B | B | x | x | x |
| ROLL ARRAY RIGHT | RAR | 0 | 1 | 1 | L | L | L | L | L | L | L | L | L | x | x | x |
| LOAD ARRAY | LDA | 1 | 1 | 1 | Q | L | L | Q | L | L | L | Q | L | x | x | x |
| OVERWRITE BOTTOM ROW | OBR | 1 | 0 | 1 | Z | Z | d | d | Z | d | d | d | | | x | |

TABLE 3-continued

| ARRAY OPERATIONS | MNEMONIC | MPX ADDRESS | | | ARRAY CELL-CLASS | | | | | | | | SUB-ARRAY CLOCKS | | |
|---|---|---|---|---|---|---|---|---|---|---|---|---|---|---|---|
| | | C | B | A | $C_0$ | $C_1$ | $C_2$ | $C_3$ | $E_0$ | $E_1$ | $E_2$ | $E_3$ | $I_{1-6}$ | L | B | A |
| OVERWRITE LEFT COLUMN | OLC | 1 | 1 | 0 | Z | d | d | Z | d | d | d | Z | d | x | | |

DEFINITIONS
R: RIGHT-ADJACENT CELL OUTPUT
T: TOP-ADJACENT CELL OUTPUT
B: BOTTOM-ADJACENT CELL OUTPUT
L: LEFT-ADJACENT CELL OUTPUT
Q: DATA SOURCE (FROM INPUT MESSAGE BUFFER)
Z: OUTPUT OF EXCLUSIVE-OR FUNCTION BLOCK (XOR)
d: DON'T CARE (IRRELEVANT)
x: GIVEN SUB-ARRAY CLOCK IS REQUIRED

TABLE 4

CELL-MULTIPLEXER INPUT ASSIGNMENT

| OPERATION: | RAL | RAD | RAU | RAR | — | OBR | OLC | LDA |
|---|---|---|---|---|---|---|---|---|
| MPX ADDRESS: | 000 | 001 | 010 | 011 | — | 101 | 110 | 111 |
| CELL | | | | | | | | |
| $C_0$ | $E_{01}$ | $E_{31}$ | $C_3$ | $C_1$ | — | $Z_7$ | $Z_0$ | $Q_0$ |
| $C_1$ | $C_0$ | $E_{11}$ | $C_2$ | $E_{06}$ | — | $Z_0$ | — | $E_{06}$ |
| $C_2$ | $C_3$ | $C_1$ | $E_{16}$ | $E_{26}$ | — | | | |
| $C_3$ | $E_{21}$ | $C_0$ | $E_{36}$ | $C_2$ | — | — | $Z_7$ | $Q_7$ |
| $E_{01}$ | $E_{02}$ | $I_{11}$ | $E_{21}$ | $C_0$ | — | $Z_6$ | — | $C_0$ |
| $E_{02}$ | $E_{03}$ | $I_{12}$ | $E_{22}$ | $E_{01}$ | — | $Z_5$ | — | $E_{01}$ |
| $E_{03}$ | $E_{04}$ | $I_{13}$ | $E_{23}$ | $E_{02}$ | — | $Z_4$ | — | $E_{02}$ |
| $E_{04}$ | $E_{05}$ | $I_{14}$ | $E_{24}$ | $E_{03}$ | — | $Z_3$ | — | $E_{03}$ |
| $E_{05}$ | $E_{06}$ | $I_{15}$ | $E_{25}$ | $E_{04}$ | — | $Z_2$ | — | $E_{04}$ |
| $E_{06}$ | $C_1$ | $I_{16}$ | $I_{26}$ | $E_{05}$ | — | $Z_1$ | — | $E_{05}$ |
| $E_{11}$ | $E_{31}$ | $E_{12}$ | $C_1$ | $I_{16}$ | | | | |
| $E_{12}$ | $E_{32}$ | $E_{13}$ | $E_{11}$ | $I_{26}$ | | | | |
| $E_{13}$ | $E_{33}$ | $E_{14}$ | $E_{12}$ | $I_{36}$ | | | | |
| $E_{14}$ | $E_{34}$ | $E_{15}$ | $E_{13}$ | $I_{46}$ | | | | |
| $E_{15}$ | $E_{35}$ | $E_{16}$ | $E_{14}$ | $I_{56}$ | | | | |
| $E_{16}$ | $E_{36}$ | $C_2$ | $E_{15}$ | $I_{66}$ | | | | |
| $E_{21}$ | $E_{22}$ | $E_{01}$ | $I_{61}$ | $C_3$ | | | | |
| $E_{22}$ | $E_{23}$ | $E_{02}$ | $I_{62}$ | $E_{21}$ | | | | |
| $E_{23}$ | $E_{24}$ | $E_{03}$ | $I_{63}$ | $E_{22}$ | | | | |
| $E_{24}$ | $E_{25}$ | $E_{04}$ | $I_{64}$ | $E_{23}$ | | | | |
| $E_{25}$ | $E_{26}$ | $E_{05}$ | $I_{65}$ | $E_{24}$ | | | | |
| $E_{26}$ | $C_2$ | $E_{06}$ | $I_{66}$ | $E_{25}$ | | | | |

| OPN: | RAL | RAD | RAU | RAR | — | OBR | OLC | LDA |
|---|---|---|---|---|---|---|---|---|
| CBA: | 000 | 001 | 010 | 011 | — | 101 | 110 | 111 |
| CELL | | | | | | | | |
| $E_{31}$ | $I_{11}$ | $E_{32}$ | $C_0$ | $E_{11}$ | — | — | $Z_1$ | $Q_1$ |
| $E_{32}$ | $I_{21}$ | $E_{33}$ | $E_{31}$ | $E_{12}$ | — | — | $Z_2$ | $Q_2$ |
| $E_{33}$ | $I_{31}$ | $E_{34}$ | $E_{32}$ | $E_{13}$ | — | — | $Z_3$ | $Q_3$ |
| $E_{34}$ | $I_{41}$ | $E_{35}$ | $E_{33}$ | $E_{14}$ | — | — | $Z_4$ | $Q_4$ |
| $E_{35}$ | $I_{51}$ | $E_{36}$ | $E_{34}$ | $E_{15}$ | — | — | $Z_5$ | $Q_5$ |
| $E_{36}$ | $I_{61}$ | $C_3$ | $E_{35}$ | $E_{16}$ | — | — | $Z_6$ | $Q_6$ |
| $I_{11}$ | $I_{12}$ | $I_{21}$ | $E_{01}$ | $E_{31}$ | | | | |
| $I_{12}$ | $I_{13}$ | $I_{22}$ | $E_{02}$ | $I_{11}$ | | | | |
| $I_{13}$ | $I_{14}$ | $I_{23}$ | $E_{03}$ | $I_{12}$ | | | | |
| $I_{14}$ | $I_{15}$ | $I_{24}$ | $E_{04}$ | $I_{13}$ | | | | |
| $I_{15}$ | $I_{16}$ | $I_{25}$ | $E_{05}$ | $I_{14}$ | | | | |
| $I_{16}$ | $E_{11}$ | $I_{26}$ | $E_{06}$ | $I_{15}$ | | | | |
| $I_{21}$ | $I_{22}$ | $I_{31}$ | $E_{11}$ | $E_{31}$ | | | | |
| $I_{22}$ | $I_{23}$ | $I_{32}$ | $I_{12}$ | $I_{21}$ | | | | |
| $I_{23}$ | $I_{24}$ | $I_{33}$ | $I_{13}$ | $I_{22}$ | | | | |
| $I_{24}$ | $I_{25}$ | $I_{34}$ | $I_{14}$ | $I_{23}$ | | | | |
| $I_{25}$ | $I_{26}$ | $I_{35}$ | $I_{15}$ | $I_{24}$ | | | | |
| $I_{26}$ | $E_{12}$ | $I_{36}$ | $I_{16}$ | $I_{25}$ | | | | |
| $I_{31}$ | $I_{32}$ | $I_{41}$ | $I_{21}$ | $E_{53}$ | | | | |
| $I_{32}$ | $I_{33}$ | $I_{42}$ | $I_{22}$ | $I_{31}$ | | | | |
| $I_{33}$ | $I_{34}$ | $I_{43}$ | $I_{23}$ | $I_{32}$ | | | | |
| $I_{34}$ | $I_{35}$ | $I_{44}$ | $I_{24}$ | $I_{33}$ | | | | |
| $I_{35}$ | $I_{36}$ | $I_{45}$ | $I_{25}$ | $I_{34}$ | | | | |
| $I_{36}$ | $E_{13}$ | $I_{46}$ | $I_{26}$ | $I_{35}$ | | | | |
| $I_{41}$ | $I_{42}$ | $I_{51}$ | $I_{31}$ | $E_{34}$ | | | | |
| $I_{42}$ | $I_{43}$ | $I_{52}$ | $I_{32}$ | $I_{41}$ | | | | |
| $I_{43}$ | $I_{44}$ | $I_{53}$ | $I_{33}$ | $I_{42}$ | | | | |
| $I_{44}$ | $I_{45}$ | $I_{54}$ | $I_{34}$ | $I_{43}$ | | | | |
| $I_{45}$ | $I_{46}$ | $I_{55}$ | $I_{35}$ | $I_{44}$ | | | | |
| $I_{46}$ | $E_{14}$ | $I_{56}$ | $I_{36}$ | $I_{45}$ | | | | |
| $I_{51}$ | $I_{52}$ | $I_{61}$ | $I_{41}$ | $E_{35}$ | | | | |
| $I_{52}$ | $I_{53}$ | $I_{62}$ | $I_{42}$ | $I_{51}$ | | | | |

TABLE 4-continued

| CELL-MULTIPLEXER INPUT ASSIGNMENT | | | | |
|---|---|---|---|---|
| $I_{53}$ | $I_{54}$ | $I_{63}$ | $I_{43}$ | $I_{52}$ |
| $I_{54}$ | $I_{55}$ | $I_{64}$ | $I_{44}$ | $I_{53}$ |
| $I_{55}$ | $I_{56}$ | $I_{65}$ | $I_{45}$ | $I_{54}$ |
| $I_{56}$ | $E_{15}$ | $I_{66}$ | $I_{46}$ | $I_{55}$ |
| $I_{61}$ | $I_{62}$ | $E_{21}$ | $I_{51}$ | $E_{36}$ |
| $I_{62}$ | $I_{63}$ | $E_{22}$ | $I_{52}$ | $I_{61}$ |
| $I_{63}$ | $I_{64}$ | $E_{23}$ | $I_{53}$ | $I_{62}$ |
| $I_{64}$ | $I_{65}$ | $E_{24}$ | $I_{54}$ | $I_{63}$ |
| $I_{65}$ | $I_{66}$ | $E_{25}$ | $I_{55}$ | $I_{64}$ |
| $I_{66}$ | $E_{16}$ | $E_{26}$ | $I_{56}$ | $I_{65}$ |

Thus referring to table 4, the first line references cell $C_0$. As indicated in the table the possible inputs to this cell via its associated multiplexer, are $E_{01}$, $E_{31}$, $C_3$, $C_1$, $Z_7$, $Z_0$, or $Q_0$. The top row of Table 4 shows the column headings related to the mnemonics which specify the particular operations to be performed. These mnemonics are defined in Table 3. The second row of Table 4 labeled CBA illustrates for the present embodiment the required setting of the cell MPX address control lines which are appropriately labeled and shown in the upper portion of FIG. 7A. It is these lines which actually select the particular multiplexer input for a given cell which is to be subsequently fed into and stored in the cell upon the occurrence of the appropriate sub-array clock pulses appearing on the lines designated CL-L, CL-B, and CL-A.

Figure 7D:
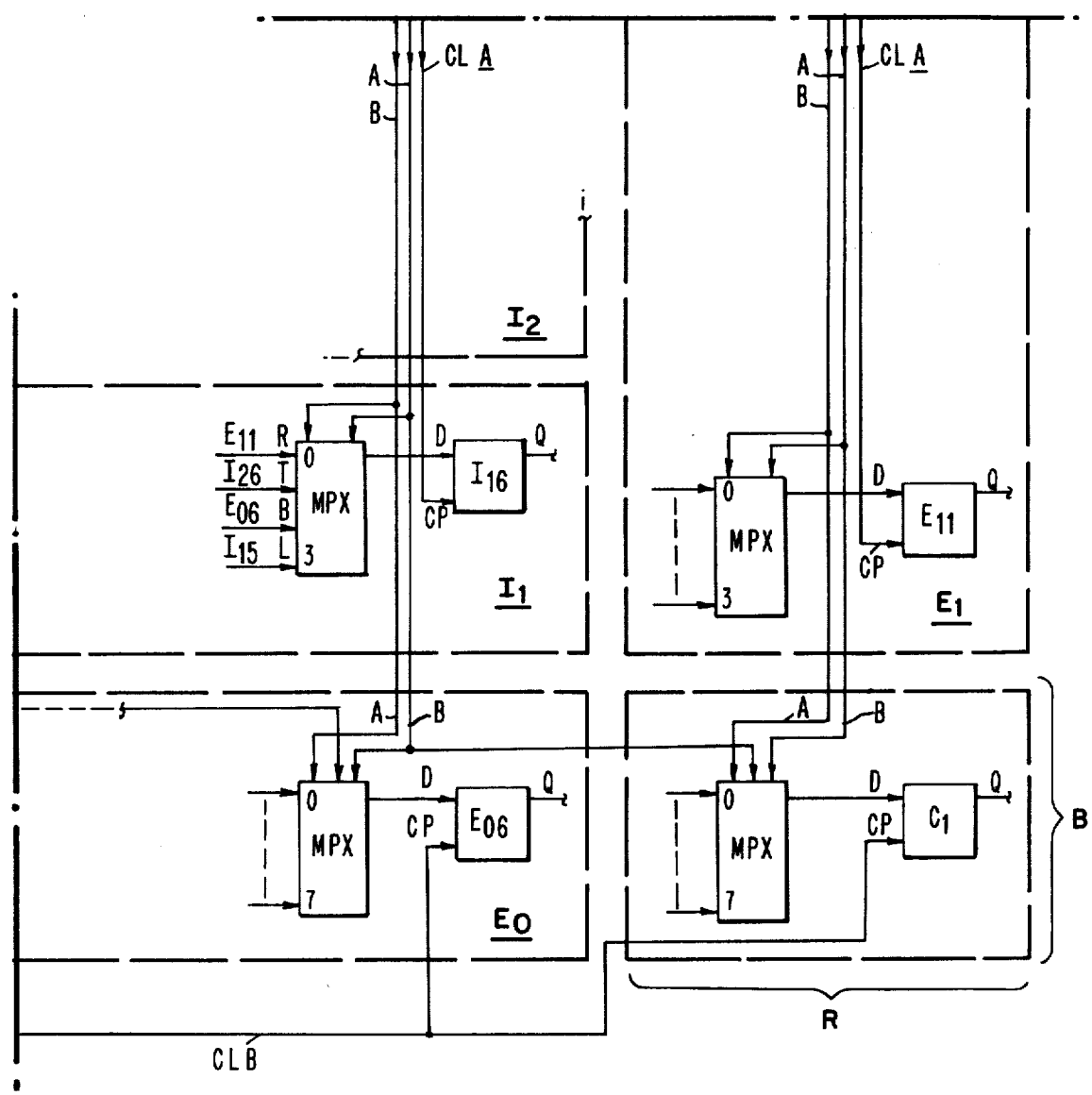

As will be apparent from Table 4, certain of the cells only have four possible inputs, such as all of the cells of rows $I_1$ through $I_6$, cells of $E_2$, $E_1$, and $C_2$. Thus, referring to FIG. 7D, the multiplexer for cell $I_{16}$ has the four possible inputs $E_{11}$, $I_{26}$, $E_{06}$, $I_{15}$. All possible inputs to the multiplexers of each and every cell in the array is specifically designated in Table 4 as well as the multiplex address configuration which will select the particular designated input.

It will be noted in Table 4, also, that a number of the interior and edge cells as stated previously only have four possible inputs. Referring to the FIG. (7) it will be noted that all of these cells only have the B and A multiplex address control lines going thereto as the third address control line C is not necessary for the selection.

Referring again to Table 3, all of the information in Table 4 is essentially present in a much coarser form plus required timing information for the sub-array clock designated on FIG. 7 as CL-L, CL-B, and CL-A. These latter sub-array clocks control the gating data from the output of the multiplexer into the actual storage cell when the appropriate clock line is energized. As explained previously, the designation L refers to the left column or edge of the array, the designation B refers to the bottom row or edge of the array and the designation A refers to all of the rest of the array except L and B.

The left-hand most column of the table (3) specifies the particular one of the eight operations which must be performed by this system at various times. The second column, entitled "mnemonic", is self-explanatory. The third column, designated "MPX address", specifies the binary configurations of the three multiplex address control lines CBA. The column designated "array cell-class" specifies the source for the signal to be gated into the cells of a particular cell class. Finally, the right most column entitled sub-array clocks specifies which clock pulses must be given or be present at the same time during the shift cycle for the various operations specified in the array operations column. A list of definitions is included at the bottom of the table for convenience of reference.

It will be noted that the formation in the three interior columns of Table 3 may be expanded to provide the specific wiring diagram data of Table 4.

Referring again to the right-hand column entitled sub-array clocks, it will be noted that for the first four operations namely the rolling operations as well as the load and unload operations, all three sub-array clocks must be present and are so designated. Conversely for the over-right bottom row, and over-right left column operations only the B and L clocks respectively are required.

Having thus described the operation and wiring details of the bidirectional shifting register shown in detail in FIG. 7, especially when taken in conjunction with Tables 3 and 4, the source of the basic control signals are provided by the control mechanism as shown in FIG. 2 (2A and 2B). As stated previously, the heart of the control mechanism is the control store or read only memory 40 which has present therein a plurality of microprogram sequences having specific binary configurations which are interpreted by the decoder 42, the address portion of the input multiplexer 44 and the selecting circuitry of the control latches 46 for producing the control signals, addresses, etc., required by the system as will be well understood by those versed in the art.

All of the outputs from the blocks 42, 44 and 46 are clearly labeled, the particular situations under which the various lines are actuated will be apparent from the subsequent microprogram sequence chart which is tied directly into the flowcharts of FIGS. 4 and 5. These sequence charts indicate which operations occur and the sequence of occurrence. As is well known with such read only memory and micro sequence control systems each instruction implies the address of the next instruction in the sequence (i.e., next memory location) and, if a branch is required, specifies the branch to address which would be loaded into the memory address register 48 if a branch were to be taken or conversely the address register would merely be incremented if no branch were involved. The primary difference between the outputs from the decoder 42 and 46 are merely the type of signal that is produced. Thus the output of the decoder 42 produces a relatively short pulse which exists only during a particular instruction whereas the outputs from the control latches 46 once set, remain set until cleared. Referring specifically to FIG. 2B in the upper portion thereof, the key register 26 is shown. The lines, at the left of this register marked $C_k$ perform the functions of loading the key register, and initiate the shifting of the register either to the right or to the left, depending upon whether a decipherment or an encipherment is occurring. The two output lines designated D and E are the two fields which control the row or column shift selection, and the substitution function selection respectively. Referring to the bottom of FIG. 2B the upper three outputs from the control latches 46 are connected to AND circuits to establish a clock mask for the sub-array clocks CL-L, CL-B, and CL-A. These clock pulses, as stated previously, determine which cells are to be energized during certain operations. The next two outputs from the control latches 46 establish a clock mask to provide clock pulses to the input and output message buffers.

The three bottom lines from the control latches 46 designated CBA are the array multiplexer address control lines which select the proper inputs to the individual array cells.

The system clock 50 is a conventional clock which controls the sequencing of the read only memory 40. The memory buffer register 52 performs the conventional function of receiving data words gated out of the control store from whence appropriate fields may be selectively gated in the input multiplexer 44, the memory address register 48, the decoder 42, or the control latches 46. Methods of selecting and setting binary bit patterns to effect the control functions desired in these units are well known in the art and would be obvious of those skilled in designing read only memory control systems.

Figure 2A:
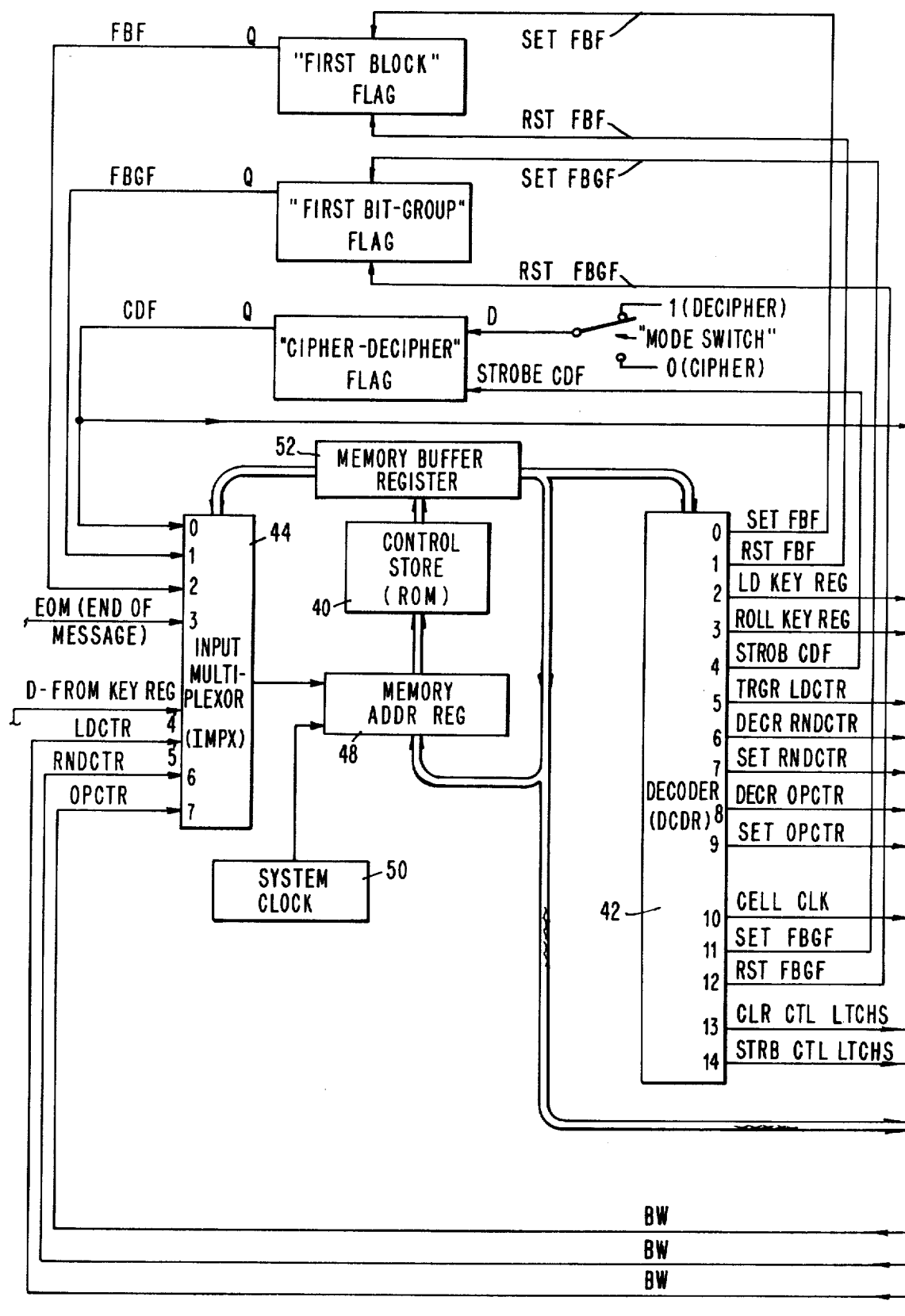

The three blocks at the top of FIG. 2A designated "first block flag", "first group flag", and "cipher/decipher flag", are the latches mentioned previously which are used in certain operational sequences to control the operation of the system as will be well understood. Similarly the three blocks entitled, load counter, round counter, and operation counter perform the following functions. The load counter controls the loading and unloading of the array. It requires eight sequences to do this and thus produces eight control pulses.

The round counter, as stated previously, is set initially to 64 and is consecutively decremented as each round is completed. This counter basically keeps track of the number of rounds performed and, when the count reaches zero, indicates that transformation of a block of data has been completed.

The operation counter is initially set to eight and decremented with each operation which as is required to complete a full transformation round within the array, whether row or column.

The following microprogram sequece chart specifies in considerable detail and specific hardware operations required to operate the disclosed embodiment, i.e., it clearly indicates the sequences, operations, branching tests, etc., which are required. It will be noted that the individual sequences are directly coordinated with the flowcharts of FIGS. 4 and 5 by the appropriate numerical designations of each sequence. In the flowcharts the first or left-most digit group of the instruction number refers to FIGS. 4 or 5, the second digit group relates to the specific block of FIGS. 4 or 5 and the last bit group refers to the step in the particular sequence making up that block. Thus, for example, the microprogram steps 5-13-2 would refer to FIG. 5, block 13 and the second microprogram step required to perform the function "roll array down". It is believed that the meaning and function of these microprogram sequence charts is completely self-explanatory, however, several examples will be described subsequently.

MICROPROGRAM SEQUENCE CHART
OVERALL SYSTEM CONTROL OPERATIONS

| Instruction No. | Function Performed |
|---|---|
| 4-1-1 | SET DECODER TO 1, (SET FBF TO 0) |
| 4-1-2 | SET DECODER TO 12, (SET FBGF TO 0) |
| 4-1-3 | SET DECODER TO 4, (STRB CDF) |
| 4-2 | SET DECODER TO 2, (LD KEY REG) |
| 4-3 | SET INPUT MULTIPLEXER (IMPX TO 2) IF IMPX = 0, GO TO 4-4 IF IMPX = 1, GO TO 4-6 |
| 4-4-1 | SET DECODER TO 13, (clears control latches) |
| 4-4-2 | SET DECODER TO 14, (This action causes appropriate bits on MBR output bus to be latched into the Control Latches such that CP-B, CP-L, CP-A, C, B, A, IMB are equal to 1, and OMB equals 0.) |
| 4-4-3 | SET IMPX TO 5. |
| 4-4-4 | TRIGGER LOAD COUNTER, (The load counter will transmit 8 pulses to the OR gate 43 to effect the loading of the array. When 8 pulses have been emitted, the Load Counter will emit a "borrow" (BW) signal and enter its quiescent state). WHEN IMPX OUTPUT LINE = 1, GO TO 4-5 (i.e., when BW received from Load Counter) |
| 4-5 | SET FIRST-BLOCK FLAG = 1. |
| 4-6-1 | SET DECODER TO 13. |
| 4-6-2 | SET CONTROL LATCHES OUTPUTS CP-L, CP-B, CP-A, IMB AND OMB = 1 |
| 4-6-3 | SET IMPX TO 5, AND TRIGGER LOAD COUNTER. (Load Counter will emit 8 pulses to OR gate, then emit BW pulse to IMPX and go to quiescent state). WHEN IMPX OUTPUT LINE = 1, GO TO 4-7 |
| 4-7 | GO TO 5-1. |
| 4-8 | SET IMPX TO 3. IF IMPX = 0, GO TO 4-3 IF IMPX = 1, GO TO 4-9 |
| 4-9-1 | SET DECODER TO 13. |
| 4-9-2 | SET DECODER TO 14. (Appropriate bit on MBR-Bus is strobed into OMB latch, OMB=1). |
| 4-9-3 | SET IMPX TO 5, (TRIGGERS LDCTR) WHEN IMPX OUTPUT LINE = 1, TERMINATE SYSTEM OPERATION. |
| ARRAY OPERATIONS | |
| 5-1 | SET DECODER TO 7, (SET RNDCTR) |
| 5-2 | SET IMPX TO 0. IF IMPX = 0, GO TO 5-6 IF IMPX = 1, GO TO 5-3 |
| 5-3 | SET IMPX TO 1 IF IMPX = 0, GO TO 5-5 IF IMPX = 1, GO TO 5-4 |
| 5-4-1 | SET DECODER TO 3. (This generates a momentary output pulse on line #3 on Decoder ("Roll Key Reg"). This pulse initiates a 2 bit shift sequence in the key register; direction is controlled by the CDF). |
| 5-4-2 | GO TO 5-7 |
| 5-5-1 | SET A-BUS TO 11 (ELEVEN). (FBGF TO 1) |
| 5-5-2 | GO TO 5-7 |
| 5-6-1 | SET DECODER TO 3. (see note under 5-4-1) |
| 5-6-2 | GO TO 5-7. |
| 5-7 | SET DECODER TO 9. (Line #9 out of Decoder, "SET OPCTR", presets the number 8 into the Operation Counter). |
| 5-8 | SELECT SUBSTITUTION FUNCTION (This function is performed via hardwired connection from "E" bit of key register to Substitution Device 20. Explicit control action from the Microprogrammed Control System is not required). |
| 5-9 | SET IMPX TO 4. IF IMPX = 0, GO TO 5-10 IF IMPX = 1, GO TO 5-14 |
| 5-10-1 | SET DECODER TO 13. (This clears the |

MICROPROGRAM SEQUENCE CHART
OVERALL SYSTEM CONTROL OPERATIONS

| Instruction No. | Function Performed |
|---|---|
| | Control Latches.) |
| 5-10-2 | SET DECODER TO 14. (This action causes appropriate bits on the MBR Bus to be latched into CONTROL LATCHES such that CP-B, C, and A equal 1, and all others equal 0). |
| 5-10-3 | SET DECODER TO 10 (TEN). (Pulses "CELL CLK" output which gates XOR 21 into B (bottom row)). |
| 5-11 | SET IMPX TO 0. IF IMPX = 0, GO TO 5-12 IF IMPX = 1, GO TO 5-13 |
| 5-12-1 | SET DECODER TO 13. (clears control latches) |
| 5-12-2 | SET DECODER TO 14. (Appropriate bits on BUS are latched into Control Latches such that: CP-L, CP-B, CP-A, B = 1; C, A = 0 which will result when the "cell clock" pulse occurs -- in the "Roll Array Up" operation). |
| 5-12-3 | SET DECODER TO 10. ("cell clock") |
| 5-13 | (SAME AS STEP 5-12, except cell MPX address controls, CBA = 001). |
| 5-14 | (SAME AS STEP 5-10, except: CBA = 110, and CP-L (instead of CP-B) equals 1). |
| 5-15 | SET IMPX TO 0. IF IMPX = 0, GO TO 5-17 IF IMPX = 1, GO TO 5-16 |
| 5-16 | (SAME AS STEP 5-12, except CBA = 000). |
| 5-17 | (SAME AS STEP 5-12, except CBA = 011). |
| 5-18 | SET DECODER TO 8. (decrements OPCTR) |
| 5-19 | SET IMPX TO 7. IF IMPX = 0, GO TO 5-9 IF IMPX = 1, GO TO 5-20 |
| 5-20 | SET DECODER TO 6. (decrements round counter) |
| 5-21 | SET IMPX TO 6. IF IMPX = 0, GO TO 5-2 IF IMPX = 1, GO TO 5-22 |
| 5-22-1 | SET DECODER TO 12. (resets FBGF) |
| 5-22-2 | GO TO 4-8. |

It will be noted in the above Microprogram Sequence Charts that there is extensive explanatory material with various microprogram steps which explain the function of the particular microprogram step insofar as what it does in the hardware system. It will be noted that in a number of the microprogram steps such as 5-13, it is stated that it is the same 5-12, with the exception noted, rather than completely repeating instructions 5-12.

The microprogram sequence charts specify the particular lines in the input multiplexer (IMPX), the decoder and the control latches which are activated by the various microprogram instructions. As will be obvious to those skilled in the art, a particular field of the instruction stored in the read only memory, and thus the memory buffer register 52, will be transferred to the appropriate control mechanism to select a particular desired line or emit a required signal.

It will also be noted that certain blocks of the flowcharts of FIGS. 4 and 5 do not have a specific microprogram instruction as they are implicit in the system design, i.e., hardwired functions which remain connected at all times and which are activated when data is gated out of the array. Thus, with step 5-8 the "substitution" function, a particular half of the substitution block, (switch or decoder) is selected by the "E" field from the key register which will automatically direct the 8 bits from the array into the substitution block which again is hardwired and will produce a specific 8 bit output for a given 8 bit input.

Control branches are handled as follows. By way of example, refer to instruction number 5-9. In the flowchart of FIG. 5 a test is made to determine whether a row or column operation is being performed. Thus, instruction 5-9 specifies that the IMPX is set to 4. This means that the input multiplexer looks at its input line 4 which is connected to the "D" field of the key register, and if this line is set to a 0 the controls within the memory address register cause the address stored therein to be simply incremented which means the system will next access instruction 5-10. If on the other hand the input to line 4 had been a 1 the control logic associated with the memory address register (MAR) would parallel load into the MAR the "branch to 5-14" address present in that field of the memory buffer register output bus that feeds into the MAR.

It will be noted from the above description, that the statement, "set unit to" means that a particular line, either input or output of the specified unit is selected by the instruction.

It is believed that the above Microprogram Sequence Chart together with the included annotations, clearly sets forth the operation of the present cryptographic system and that any operation as specified in the flowcharts of FIGS. 4 and 5, may be readily followed insofar as the hardware ramifications are concerned by appropriate reference to the Microprogram Sequence Charts and the hardware drawings of FIGS. 1 and 2.

CONCLUSIONS

The previous description of the microprogram sequence chart completes the description of the disclosed preferred embodiment of the present cryptographic system. While the above embodiment constitutes a preferred form of the invention, it is to be understood, however, that many changes in form and detail could be made by those skilled in the art which would result in a somewhat different looking architecture.

For example, a square matrix, i.e., 8 by 8 has been disclosed as this is a conventional byte size in many classes of computer systems and is accordingly a convenient data block to utilize in such a block cipher cryptographic system. This of course results in the encryption of a sixty-four bit block in any one cycle of operation of the system. However, a different matrix size or even a non-square matrix could also be utilized without altering the concepts of the present invention.

Similarly sixty-four rounds have been disclosed, however, a greater number or a smaller number could be utilized by appropriately changing the setting of the round counters and making certain that the same number of rounds are utilized both for encryption and decryption. Closely connected with the number of rounds is the size of the unique user supplied key. For the present embodiment it has been assumed that a one hundred twenty-eight bit key is available (64×2) however, the size of the key could also be varied without too much difficulty.

While a single key bit, i.e. "E" has been utilized to give a twofold increase in the substitution complexity it will be readily understood that more than one key bit could be utilized as well as the eight data bits in a row or a column to add an even greater degree of complexity and cryptographic security to the system.

Further, the specific details of the disclosed two dimensional shifting array are considered to be representative of an optimal design, however, it should be readily understood that other forms of the array would also be realizable in a more conventional form such as a series of 8 bit shift registers capable of having data gated in serially at either end, or in parallel and appropriately interconnecting the registers.

As a still further variant of the shifting array, it would be possible to utilize a three dimensional array and utilize three or more shifting coordinates. In this instance at least a 2 bit "D" field would be required.

These and other modifications could readily be made by skilled systems designers without departing from the spirit and scope of the present invention. It is also possible that the concept of the invention could be realized in software in a somewhat more cumbersome form.

What is claimed is:

1. A Block-Cipher Cryptographic System for enciphering/deciphering a block of binary data under the control of a unique binary key, said system including a multidirectional shift matrix capable of shifting in at least two directions along a predetermined coordinate of said matrix said system further including means for loading said matrix with a block of data to be cryptographically transformed, means for loading said binary key, means for causing said matrix to shift to a predetermined distance along a coordinate of said array which is a function of said key, end around connection means for said array for transferring data shifted out of one edge thereof back into the opposite edge, and means for continuing said shifting operations for a predetermined number of rounds until the cryptographic transformation process is completed.

2. A cryptographic system as set forth in claim 1 including means for performing a plurality of shifting operations which continue until each segment in the matrix has passed through said shifting operation and including means for further cryptographically transforming a segment of data during its transition from one edge of the array back into the opposite edge.

3. A cryptographic system as set forth in claim 2 including means for continuing said shifting operations along the coordinate specified by a given key field until all of the segments of data in said array have been transformed by said system, said transformation constituting a single encryption round.

4. A cryptographic system as set forth in claim 3, wherein said means for further cryptographically transforming comprises means for performing a non-affine transformation on each segment of data shifted out of one edge of said array and means for returning said transformed segment back into the opposite edge of said array.

5. A cryptographic system as set forth in claim 4 wherein said non-affine transformation means comprises means for substituting a new segment of data for the segment gated out of said array as a function of the data content of said segment and a predetermined field of said key and means for using the same key material for each shifting operation within a given round and for using different key material for different rounds.

6. A cryptographic system as set forth in claim 5 including exclusive-or means for performing an exclusive-or transformation on the output of said non-affine transformation means and another segment of data currently in said array and means for gating the output of said exclusive-or means back into said other edge of said array.

7. A cryptographic system as set forth in claim 6 wherein said array is a two dimensional rectangular array having as many storage locations as there are bits in a data block said array having the dimensions m (rows) and n (columns) and means for performing m × n rounds of encryption on said data block stored in said array as a function of said key.

8. A cryptographic system as set forth in claim 7 wherein said array is square (m × m) and wherein said means for shifting and transforming a segment of data performs m such shifting and transformation operations along the coordinate selected as a function of said key to complete a single round of encryption.

9. A key controlled block-cipher cryptographic system for selectively enciphering or deciphering a block of binary data presented thereto under the control of a unique user-supplied binary key, said system including a bidirectional shifting matrix capable of shifting in either direction along both axes of said matrix, said system further including, means for loading said matrix with a block of data to be cryptographically transformed and for unloading said matrix subsequent to said transformation, means for loading said unique binary key, means for accessing a predetermined segment of said key and causing said matrix to shift along a coordinate of said array which is a function of said key, end around connection means for said array for transferring data shifted out of one edge thereof back into the opposite edge, means for performing a non-affine transformation on each segment of data shifted out of one edge of said array, and means for returning said transformed segment of data back into the opposite edge of said array, means for continuning said shifting and transformation operations on the contents of said array as a function of a given portion of said key until all of the rows or columns of said array being currently shifted have been transformed by the shifting operation, said complete transformation comprising a single round of encryption, means for continuing said cryptographic transformation process for a predetermined number of rounds wherein each round is under control of different consecutive segments of said key, and means for causing said system to access different key segments on successive rounds.

10. A cryptographic system as set forth in claim 9 including means for reversing the order of key presentation and the direction of shifting between encipherment and decipherment operations whereby said system performs a mathematically invertible transformation on the block of data presented thereto.

11. A cryptographic system as set forth in claim 10, including means for performing an exclusive-or operation on a data segment gated out of one edge of said array which has been transformed by said non-affine transformation means and the data segment currently stored in the opposite edge of said array, and means for transferring the result of said exclusive-or operation back into the opposite edge of said array.

12. A cryptographic system as set forth in claim 11, wherein said non-affine transformation means comprises a substitution matrix for substituting a new n bit segment of data for the n bit segment of data appearing as an input to said means, means for performing substitution selection as a function of the data content of the old segment and at least one bit of said key, and means for using the same bit of said key for all substitution transformations occurring within a single encryption round and for utilizing a different key bit on successive rounds.

13. A method for cryptographically transforming a block of binary data under control of a unique user-supplied key consisting of a set of binary symbols, said method including the steps of:
  bidirectionally shifting rows and columns (data segments) of blocks of data loaded into a bidirectional shifting matrix, said shifting direction being selected as a function of a predetermined bit of said binary key,
  transferring data shifted out of one edge of said bidirectional matrix back into the opposite edge thereof during shifting operations,
  performing an exclusive-or operation utilizing as one input thereto a data segment which is a function of the segment of data shifted out of one edge of said matrix and the contents of a predetermined portion of said matrix as the other input thereto, and
  transferring the result of said exclusive-or operation back into the opposite edge of said matrix,
  continuing said shifting and exclusive-or operations under control of a given key segment until all of the contents of the matrix have been transformed, said transformation comprising a single encryption round,
  continuing said rounds of encryption under control of different successive key segments until a predetermined number of rounds have been performed, and gating the so transformed block of data out of the system as a cryptographically transformed block.

14. A method as set forth in claim 12, including the step of performing a non-affine substitution transformation on each segment of data shifted out of one edge of said matrix prior to said exclusive-or operation, performing said non-affine substitution operation as a function of a predetermined segment of said key wherein the same key segment is used during a given cryptographic round and wherein different segments are used on consecutive rounds.

15. A method as set forth in claim 14 including the steps of presenting the segments of said key in a first order and shifting the matrix in a first direction during an encryption operation and presenting the segments of said key in the opposite order and shifting the matrix in the opposite direction during a decryption operation whereby the method is mathematically invertible.

* * * * *